US009459839B2

(12) United States Patent
Kisynski et al.

(10) Patent No.: US 9,459,839 B2
(45) Date of Patent: Oct. 4, 2016

(54) SYSTEMS AND METHODS TO SYNCHRONIZE ARTIFACT RELATIONSHIPS ACROSS A PLURALITY OF REPOSITORIES

(71) Applicant: TaskTop Technologies, Incorporated, Vancouver (CA)

(72) Inventors: Jacek Kisynski, Vancouver (CA); Colin Ritchie, Vancouver (CA); Benjamin Muskalla, Karlsruhe (DE); Mik Kersten, Vancouver (CA)

(73) Assignee: TASKTOP TECHNOLOGIES, INCORPORATED, Vancouver (CA)

( * ) Notice: Subject to any disclaimer, the term of this patent is extended or adjusted under 35 U.S.C. 154(b) by 0 days.

(21) Appl. No.: 14/571,113

(22) Filed: Dec. 15, 2014

(65) Prior Publication Data

US 2016/0170715 A1    Jun. 16, 2016

(51) Int. Cl.
*G06F 9/44*       (2006.01)
*G06F 17/30*      (2006.01)

(52) U.S. Cl.
CPC . *G06F 8/20* (2013.01); *G06F 8/70* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 5,301,320 A | | 4/1994 | McAtee et al. |
| 5,706,509 A | | 1/1998 | Man-Hak Tso |
| 5,884,081 A | * | 3/1999 | Burbeck .................. G06F 8/10 |
| | | | 707/999.102 |
| 5,970,501 A | | 10/1999 | Hunkins et al. |
| 6,199,198 B1 | * | 3/2001 | Graham .................... G06F 8/74 |
| | | | 714/E11.217 |
| 6,397,192 B1 | | 5/2002 | Notani et al. |
| 6,460,051 B1 | | 10/2002 | LaRue et al. |
| 6,505,200 B1 | | 1/2003 | Ims et al. |

(Continued)

FOREIGN PATENT DOCUMENTS

| | | |
|---|---|---|
| EP | 2 160 689 A2 | 3/2010 |
| EP | 2 169 552 A1 | 3/2010 |

OTHER PUBLICATIONS

Selvage-Websphere Business Modeler-2009, located at http://www.ibm.com/developerworks/data/library/techarticle/dm-0711selvage/2009.*

(Continued)

*Primary Examiner* — Wei Zhen
*Assistant Examiner* — Hossain Morshed
(74) *Attorney, Agent, or Firm* — Seed IP Law Group PLLC

(57) ABSTRACT

Systems and methods synchronize artifact relationships across a plurality of repositories. One example method includes mapping a first relationship of a first relationship type between a first source artifact in a first repository and a second source artifact to a second relationship of a second relationship type between a first target artifact in a second repository and a second target artifact according to a relationship mapping provided by a schema mapping guide. One example system includes a repository synchronizer to synchronize artifact relationship across at least first and second repositories. The repository synchronizer can include at least one processor. The example system can further include one or more schema mapping guides that provide one or more relationship mappings between the first and second repositories.

26 Claims, 9 Drawing Sheets

(56) References Cited

U.S. PATENT DOCUMENTS

| | | | |
|---|---|---|---|
| 7,089,530 B1* | 8/2006 | Dardinski | G05B 15/02 700/83 |
| 7,149,742 B1* | 12/2006 | Eastham | G06F 17/30575 |
| 7,181,739 B1* | 2/2007 | Harral | G06F 8/61 717/170 |
| 7,480,907 B1 | 1/2009 | Marolia et al. | |
| 7,496,606 B2 | 2/2009 | Hind et al. | |
| 7,516,167 B2 | 4/2009 | Selman et al. | |
| 7,555,497 B2* | 6/2009 | Thompson | G06F 17/30233 |
| 7,565,381 B2 | 7/2009 | Oswalt | |
| 7,607,130 B2 | 10/2009 | Singh et al. | |
| 7,693,888 B2 | 4/2010 | Urscheler et al. | |
| 7,822,708 B1* | 10/2010 | Mathew | G06F 17/30604 707/610 |
| 7,827,565 B2 | 11/2010 | Minium, Jr. et al. | |
| 7,917,534 B2* | 3/2011 | Demiroski | G06F 9/4433 707/790 |
| 7,941,449 B2* | 5/2011 | Liu | G06F 17/30557 706/55 |
| 7,962,448 B2* | 6/2011 | Creamer | G06Q 50/22 705/2 |
| 7,962,891 B2 | 6/2011 | Kimelman et al. | |
| 8,131,672 B2 | 3/2012 | Hind et al. | |
| 8,166,101 B2* | 4/2012 | Shah | G06F 17/30595 709/203 |
| 8,315,976 B2 | 11/2012 | Multer et al. | |
| 8,849,987 B2 | 9/2014 | Berg et al. | |
| 9,104,668 B2* | 8/2015 | Novak | G06F 17/30002 |
| 9,104,740 B2* | 8/2015 | Herbeck | G06F 17/30289 |
| 2002/0059299 A1 | 5/2002 | Spaey | |
| 2004/0148299 A1 | 7/2004 | Teegan et al. | |
| 2005/0204367 A1 | 9/2005 | Minium, Jr. et al. | |
| 2006/0241956 A1* | 10/2006 | Levy | G06Q 10/10 703/6 |
| 2007/0083813 A1* | 4/2007 | Lui | G06F 11/3612 715/709 |
| 2007/0136265 A1* | 6/2007 | Hunt | G06F 17/30604 |
| 2007/0282802 A1 | 12/2007 | Wilhelm | |
| 2007/0283050 A1* | 12/2007 | Savage | G06F 17/30174 709/248 |
| 2007/0288854 A1* | 12/2007 | Koskimies | G06F 9/4443 715/760 |
| 2008/0194315 A1 | 8/2008 | Seelig et al. | |
| 2008/0201362 A1* | 8/2008 | Multer | G06F 17/30174 |
| 2008/0243935 A1* | 10/2008 | Castro | G06F 11/1458 |
| 2008/0256038 A1 | 10/2008 | Kimelman et al. | |
| 2008/0281863 A1 | 11/2008 | Pospisil et al. | |
| 2010/0011337 A1 | 1/2010 | Young et al. | |
| 2010/0017792 A1 | 1/2010 | Young et al. | |
| 2010/0030893 A1 | 2/2010 | Berg et al. | |
| 2010/0145907 A1* | 6/2010 | Carbajales | H04L 67/24 707/610 |
| 2010/0145910 A1 | 6/2010 | Zhao et al. | |
| 2010/0274785 A1* | 10/2010 | Procopiuc | G06F 17/30312 707/737 |
| 2011/0047126 A1 | 2/2011 | Vargas et al. | |
| 2011/0078114 A1* | 3/2011 | Herbeck | G06F 17/30011 707/638 |
| 2013/0091099 A1 | 4/2013 | Novak et al. | |
| 2014/0059017 A1* | 2/2014 | Chaney | G06F 17/30595 707/692 |

OTHER PUBLICATIONS

Lainwala-WebSphere relationship service-static-2006, located at http://www.ibm.com/developerworks/websphere/library/techarticles/0604_lainwala/0604_lainwala.html 2006.*

Selvage, Integrate WebSphere Business Modeler, located at http://www.ibm.com/developerworks/data/library/techarticle/dm-0711selvage/ 2009.*

Lainwala, WebSphere Process Server, located at http://www.ibm.com/developerworks/websphere/library/techarticles/0604_lainwala/0604_lainwala.html 2006.*

Golbeck et al., "System and Method for Synchronizing States in Associated Data Records," U.S. Appl. No. 13/833,901, filed Mar. 15, 2013, 14 pages.

Golbeck et al., "System and Method for Synchronizing States in Associated Data Records," Preliminary Amendment filed Apr. 7, 2014, for U.S. Appl. No. 13/833,901, 20 pages.

Golbeck et al., "System and Method for Synchronizing States in Associated Data Records," Office Action mailed Mar. 25, 2015, for U.S. Appl. No. 13/833,901, 21 pages.

Janzen, "System and Method for Repairing Data Synchronization Links," U.S. Appl. No. 13/834,365, filed Mar. 15, 2013, 16 pages.

Janzen, "System and Method for Repairing Data Synchronization Links," Preliminary Amendment filed Apr. 7, 2014, for U.S. Appl. No. 13/834,365, 22 pages.

International Search Report, mailed Mar. 24, 2016, for corresponding International Application No. PCT/US2015/065615, 5 pages.

\* cited by examiner

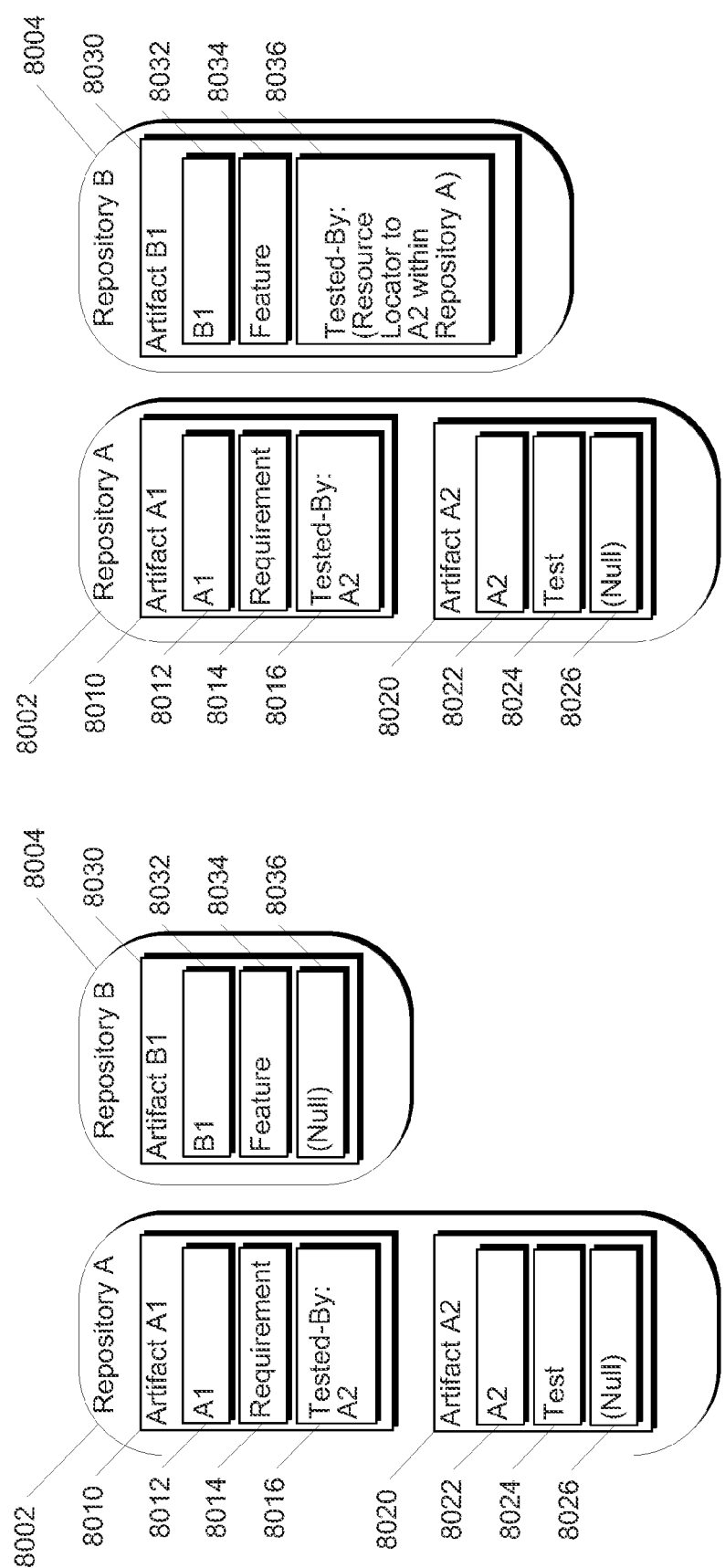

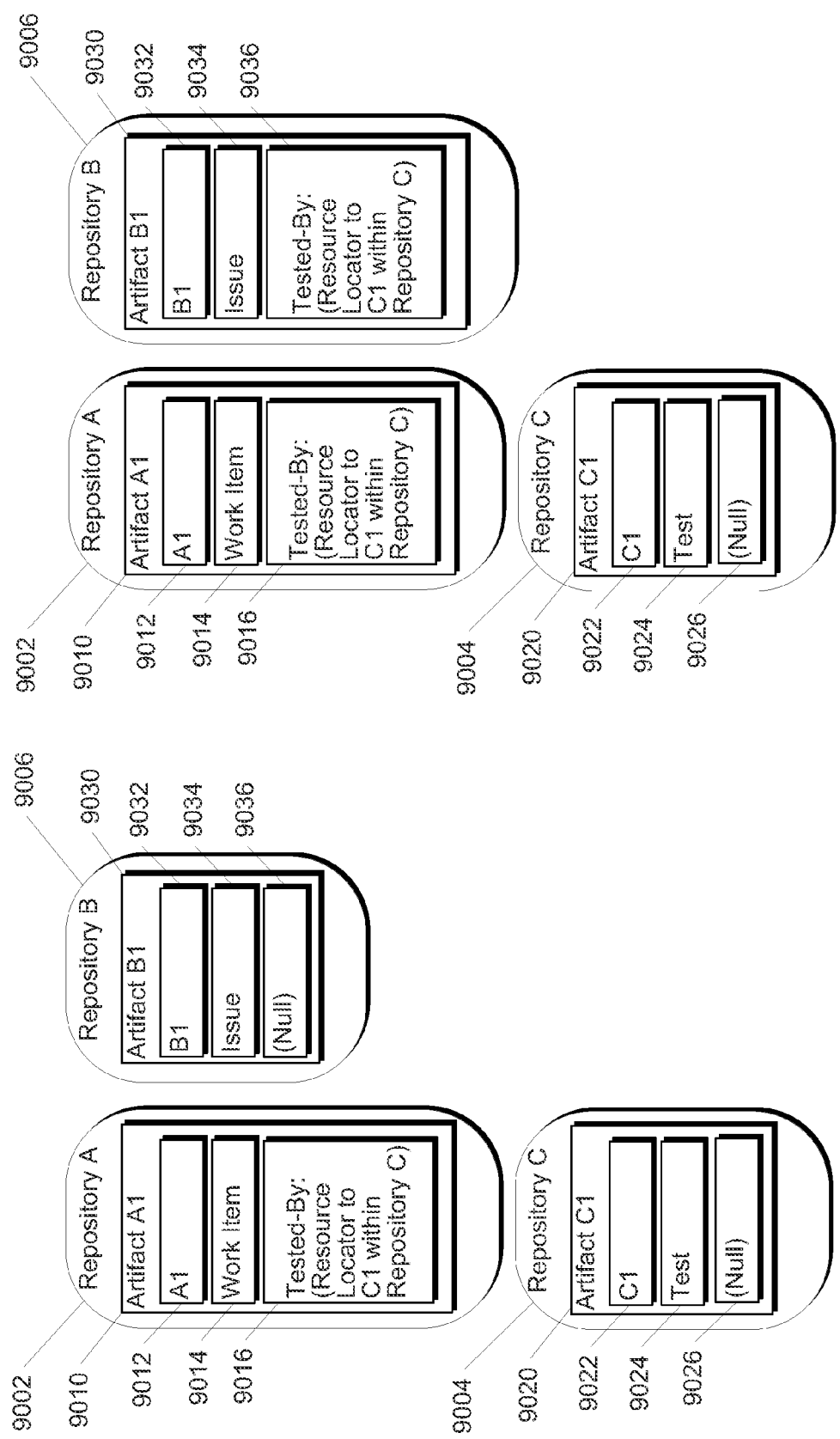

SYSTEMS AND METHODS TO SYNCHRONIZE ARTIFACT RELATIONSHIPS ACROSS A PLURALITY OF REPOSITORIES

BACKGROUND

1. Technical Field

The present disclosure generally relates to synchronization of data across a plurality of repositories and, more particularly, to systems and methods to efficiently synchronize artifact relationships across a plurality of repositories associated with different computer applications or tools.

2. Description of the Related Art

Many different computer applications or tools exist that perform different functions or enable users to perform different operations. As an example, many different tools exist that assist the development of software products by an organization. Each of such software development tools may provide different features, functions, or data representations that are useful for certain aspects or stages of the development process or are useful to different individuals with different roles within the organization. For example, a business analyst may use a first software development tool to perform her functions within the organization while a developer uses a second, different development tool to perform his functions within the organization. Likewise, other individuals with different organizational roles (e.g., testers, deployment, operations, etc.) may use additional tools as well.

Each software development tool may allow users to create and manage artifacts within a repository associated with such software development tool. Each artifact is a representation of an aspect of the development process.

Different software development tools may use different artifact types to represent different aspects of the development process. As an example, a first software development tool may allow the business analyst to generate and manage artifacts that represent epics, features, user stories, requirements, or other business concepts. Likewise, a second software development tool may allow the developer to generate and manage artifacts that represent tasks, defects, or other development concepts. A third software development tool may allow a tester to generate and manage artifacts representative of tests or other testing concepts.

Furthermore, each software development tool may allow users to define and manage relationships between the artifacts contained in the associated repository. The relationships may have different defined relationship types. For example, the business analyst may define that a user story artifact depends upon a particular feature artifact. Such defined relationships may be useful in organizing and performing the development process within each corresponding tool.

BRIEF SUMMARY

The use of various different software development tools within a single organization or with respect to a single project results in various challenges. In particular, individuals that work as a team must be able to effectively collaborate and communicate about various aspects of the development process. Thus, for example, a developer's progress on resolving a defect artifact may be highly relevant to the business analyst's user story artifact. However, if such two artifacts are contained in different repositories associated with different tools, the developer and the business analyst may have difficulty collaborating and communicating with respect to such aspect.

As an example, one user may be forced to use an unfamiliar tool to understand the current work status of a second user. As another example, manually updating a first artifact within a first repository to reflect changes or developments with respect to a second artifact in a second repository is highly inefficient and prone to user-introduced error.

The use of artifact relationships within repositories provides yet additional challenges. For example, a first set of relationship types available within a first tool may not match a second set of relationship types available within a second tool. As another example, relationships that are internal within a first repository may be an external relationship when synchronized into a second repository, or may have other differentiating characteristics. Thus, even assuming that effective means to synchronize artifacts across different repositories exist, the synchronization of relationships across repositories with different artifact and relationship types presents additional, unique challenges. Therefore, systems and methods to synchronize artifact relationships are desirable.

A method of operation in a repository synchronizer to synchronize artifact relationships across a plurality of repositories, the repositories respectively associated with respective ones of a plurality of software development tools, the repository synchronizer comprising at least one processor and at least one non-transitory processor-readable medium communicatively coupled to the at least one processor and which stores at least one of processor-executable instructions or data, may be summarized as including for a first source artifact in a first repository associated with a first development tool, the first source artifact which is logically associated by a defined first relationship of a first relationship type with a second source artifact: identifying a first target artifact in a second repository that corresponds to the first source artifact, the second repository associated with a second development tool, the second development tool different from the first development tool; determining a defined second relationship type for a second relationship between the first target artifact in the second repository that corresponds to the first source artifact in the first repository and a second target artifact that corresponds to the second source artifact, the determined defined second relationship type from a second set of defined relationship types for the second repository which is different from a first set of defined relationship types for the first repository; and causing the second relationship between the first target artifact and the second target artifact to match the determined defined second relationship type.

Determining a defined second relationship type for a second relationship between the first target artifact in the second repository that corresponds to the first source artifact in the first repository and a second target artifact that corresponds to the second source artifact may include determining the defined second relationship type based at least in part on a schema mapping guide that provides a relationship mapping from the first relationship type in the first repository to the defined second relationship type in the second repository. Determining the defined second relationship type based at least in part on a schema mapping guide that provides a relationship mapping from the first relationship type in the first repository to the defined second relationship type in the second repository may include determining the defined second relationship type based at least in part on the schema mapping guide that provides a user-defined relationship mapping from the first relationship type in the first repository to the defined second relationship type in the second repository. Causing the second relationship between the first target artifact and the second target artifact to match the determined defined second relationship type may include establishing the second relationship of the determined defined second relationship type between the first target artifact and the second target artifact. Causing the second relationship between the first target artifact and the second target artifact to match the determined defined second relationship type may include changing the second relationship between the first target artifact and the second target artifact to the determined defined second relationship type from a third relationship type. Causing the second relationship between the first target artifact and the second target artifact to match the determined defined second relationship type may include determining that the second relationship exists between the first target artifact and the second target artifact as the determined defined second relationship type and leaving the second relationship between the first target artifact and the second target artifact as the determined defined second relationship type.

The method may further include, prior to identifying the first target artifact in the second repository that corresponds to the first source artifact, receiving an indication of an alteration of one or more data fields associated with the first source artifact; and scanning the data fields of the first source artifact to identify as unprocessed the defined first relationship. Identifying the first target artifact in the second repository that corresponds to the first source artifact may include identifying, autonomously by the repository synchronizer, the first target artifact in the second repository that corresponds to the first source artifact, determining the defined second relationship type for the second relationship may include determining, autonomously by the repository synchronizer, the defined second relationship type for the second relationship, and causing the second relationship between the first target artifact and the second target artifact to match the determined defined second relationship type may include causing, autonomously by the repository synchronizer, the second relationship between the first target artifact and the second target artifact to match the determined defined second relationship type. Identifying the first target artifact in the second repository that corresponds to the first source artifact may include identifying, periodically and not responsive to human prompting, the first target artifact in the second repository that corresponds to the first source artifact, determining the defined second relationship type for the second relationship may include determining, periodically and not responsive to human prompting, the defined second relationship type for the second relationship, and causing the second relationship between the first target artifact and the second target artifact to match the determined defined second relationship type may include causing, periodically and not responsive to human prompting, the second relationship between the first target artifact and the second target artifact to match the determined defined second relationship type. Each of the first source artifact, the second source artifact, the first target artifact, and the second target artifact may include one of a task, a goal, a user story, an epic, a defect, a requirement, an issue, or a test. Determining a defined second relationship type for a second relationship between the first target artifact in the second repository that corresponds to the first source artifact in the first repository and a second target artifact that corresponds to the second source artifact may include determining whether the first relationship between the first source artifact and the second source artifact is an internal relationship within the first repository; responsive to determining that the first relationship is an internal relationship within the first repository, determining whether the second relationship between the first target artifact and the second target artifact is to be an internal relationship within the second repository; and responsive to determining that the second relationship is to be an internal relationship within the second repository, determining whether the second target artifact exists within the second repository.

Determining a defined second relationship type for a second relationship between the first target artifact in the second repository that corresponds to the first source artifact in the first repository and a second target artifact that corresponds to the second source artifact may further include marking one or more of the first source artifact, the defined first relationship, and the second target artifact as pending in response to determining that the second target artifact does not exist within the second repository. Determining a defined second relationship type for a second relationship between the first target artifact in the second repository that corresponds to the first source artifact in the first repository and a second target artifact that corresponds to the second source artifact may include determining whether the first relationship between the first source artifact and the second source artifact is an internal relationship within the first repository; responsive to determining that the first relationship is an internal relationship within the first repository, determining whether the second relationship between the first target artifact and the second target artifact is to be an internal relationship within the second repository; and responsive to determining that the second relationship is not to be an internal relationship within the second repository, generating a resource locator that describes a location of the second source artifact within the first repository or a third repository. Generating a resource locator that describes a location of the second source artifact within the first repository or a third repository may include generating a user-selectable uniform resource locator (URL) providing access to the location of the second source artifact within the first repository or the third repository. Causing the second relationship between the first target artifact and the second target artifact to match the determined defined second relationship type may include associating the resource locator that describes the location of the second source artifact with the first target artifact as the second relationship. Determining a defined second relationship type for a second relationship may include determining whether the first relationship between the first source artifact and the second source artifact is an internal relationship within the first repository and causing the second relationship between the first target artifact and the second target artifact to match the determined defined second relationship type may include, responsive to determining that the first relationship is not an internal relationship within the first repository, merging a resource locator that describes a location of the second source artifact within the first repository or a third repository with any existing resource locators associated with existing relationships of the first target artifact.

A system to enable collaborative development of software products across a plurality of software development tools may be summarized as including at least a first repository that stores a first plurality of artifacts associated with a first software development tool and a second repository that stores a second plurality of artifacts associated with a second software development tool that is different from the first software development tool; and a repository synchronizer to synchronize artifact relationships across at least the first and second repositories, the repository synchronizer comprising at least one processor and at least one non-transitory processor-readable medium communicatively coupled to the at least one processor and which stores processor-executable instructions, execution of which causes, for at least a first source artifact of the first repository that is logically associated by a defined first relationship of a first relationship type with a second source artifact, the repository synchronizer to: identify a first target artifact in the second repository that corresponds to the first source artifact; determine a defined second relationship type for a second relationship between the first target artifact in the second repository that corresponds to the first source artifact in the first repository and a second target artifact that corresponds to the second source artifact, the determined defined second relationship type from a second set of defined relationship types for the second repository which is different from a first set of defined relationship types for the first repository; and cause the second relationship between the first target artifact and the second target artifact to match the determined defined second relationship type.

The repository synchronizer may determine the defined second relationship type based at least in part on a schema mapping guide that provides a relationship mapping between the first relationship type in the first repository and the defined second relationship type in the second repository. The relationship mapping provided by the schema mapping guide may be user-defined. The instructions that cause the repository synchronizer to cause the second relationship between the first target artifact and the second target artifact to match the determined defined second relationship type may cause the repository synchronizer to establish the second relationship of the determined defined second relationship type between the first target artifact and the second target artifact. The instructions that cause the repository synchronizer to cause the second relationship between the first target artifact and the second target artifact to match the determined defined second relationship type may cause the repository synchronizer to change the second relationship between the first target artifact and the second target artifact to the determined defined second relationship type from a third relationship type. The instructions that cause the repository synchronizer to cause the second relationship between the first target artifact and the second target artifact to match the determined defined second relationship type may cause the repository synchronizer to determine that the second relationship exists between the first target artifact and the second target artifact as the determined defined second relationship type and leave the second relationship between the first target artifact and the second target artifact as the determined defined second relationship type. The instructions may cause the repository synchronizer to autonomously identify the first target artifact in the second repository, autonomously determine the defined second relationship type for the second relationship, and autonomously cause the second relationship between the first target artifact and the second target artifact to match the determined defined second relationship type. The instructions may cause the repository synchronizer to periodically and not responsive to human prompting identify the first target artifact in the second repository, periodically and not responsive to human prompting determine the defined second relationship type for the second relationship, and periodically and not responsive to human prompting cause the second relationship between the first target artifact and the second target artifact to match the determined defined second relationship type A method to synchronize artifact relationships across a plurality of repositories respectively associated with a plurality of software development tools may be summarized as including receiving, by one or more computing devices, data that describes a first attribute field associated with a first source artifact contained in a source repository associated with a first software development tool of the plurality of software development tools, the first attribute field that describes a first relationship of a first relationship type between the first source artifact and at least a second source artifact; obtaining, by the one or more computing devices, a schema mapping guide that describes at least one relationship mapping between the first relationship type in the source repository and a second relationship type in a target repository associated with a second software development tool of the plurality of software development tools, the second software development tool different than the first software development tool; and updating, by the one or more computing devices based at least in part on the first attribute field and the schema mapping guide, a second attribute field associated with a first target artifact contained in the target repository to describe a second relationship of the second relationship type between the first target artifact and at least a second target artifact.

Obtaining, by the one or more computing devices, the schema mapping guide may include obtaining, by the one or more computing devices, the schema mapping guide that describes at least one user-defined relationship mapping between the first relationship type in the source repository and the second relationship type in the target repository. Receiving, by the one or more computing devices, data that describes a first attribute field associated with a first source artifact may include receiving, by the one or more computing devices, an indication that a change has occurred in one or more attribute fields associated with the first source artifact and scanning, by the one or more computing devices, the one or more attribute fields to identify as unprocessed a change in the first attribute field.

The method may further include determining, by the one or more computing devices, whether the second target artifact is included in the target repository with the first target artifact, wherein when it is determined that the second target artifact is not included in the target repository with the first target artifact, updating, by the one or more computing devices based at least in part on the first attribute field and the schema mapping guide, a second attribute field associated with a first target artifact comprises generating, by the one or more computing devices, a resource locator that describes a location of the second target artifact within the source repository or a third repository and associating, by the one or more computing devices, the resource locator with the first target artifact.

The method may further include determining, by the one or more computing devices, whether the second source artifact is included in the source repository with the first source artifact, wherein when it is determined that the second source artifact is not included in the source repository with the first source artifact, updating, by the one or more computing devices based at least in part on the first attribute field and the schema mapping guide, a second attribute field associated with a first target artifact comprises associating, by the one or more computing devices, a resource locator that describes a location of the second source artifact with the first target artifact.

A method of operation in a repository synchronizer to synchronize artifact relationships across a plurality of repositories, the repositories respectively associated with respective ones of a plurality of computer applications, the repository synchronizer comprising at least one processor and at least one non-transitory processor-readable medium communicatively coupled to the at least one processor and which stores at least one of processor-executable instructions or data, may be summarized as including for a first source artifact in a first repository associated with a first computer application, the first source artifact which is logically associated by a defined first relationship of a first relationship type with a second source artifact: identifying a first target artifact in a second repository that corresponds to the first source artifact, the second repository associated with a second computer application; determining a defined second relationship type for a second relationship between the first target artifact in the second repository that corresponds to the first source artifact in the first repository and a second target artifact that corresponds to the second source artifact, the determined defined second relationship type from a second set of defined relationship types for the second repository which is different from a first set of defined relationship types for the first repository; and causing the second relationship between the first target artifact and the second target artifact to match the determined defined second relationship type.

The second computer application may be a different application than the first computer application. The first computer application may be a first instance of a computer application and the second computer application may be a second instance of the same computer application. The first and second computer applications may be software development tools or may be computer applications other than software development tools.

A system to enable collaboration across a plurality of computer applications may be summarized as including at least a first repository that stores a first plurality of artifacts associated with a computer application and a second repository that stores a second plurality of artifacts associated with a second computer; and a repository synchronizer to synchronize artifact relationships across at least the first and second repositories, the repository synchronizer comprising at least one processor and at least one non-transitory processor-readable medium communicatively coupled to the at least one processor and which stores processor-executable instructions, execution of which causes, for at least a first source artifact of the first repository that is logically associated by a defined first relationship of a first relationship type with a second source artifact, the repository synchronizer to: identify a first target artifact in the second repository that corresponds to the first source artifact; determine a defined second relationship type for a second relationship between the first target artifact in the second repository that corresponds to the first source artifact in the first repository and a second target artifact that corresponds to the second source artifact; and cause the second relationship between the first target artifact and the second target artifact to match the determined defined second relationship type.

The second computer application may be a different application than the first computer application. The first computer application may be a first instance of a computer application and the second computer application may be a second instance of the same computer application. The first and second computer applications may be software development tools or may be computer applications other than software development tools. The determined defined second relationship type may be from a second set of defined relationship types for the second repository which is different from a first set of defined relationship types for the first repository.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 8A and 8B are block diagrams respectively showing artifacts before and after an internal-to-external synchronization, according to at least one illustrated embodiment.

FIGS. 9A and 9B are block diagrams respectively showing artifacts before and after an external-to-external synchronization, according to at least one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing devices have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Figure 1:
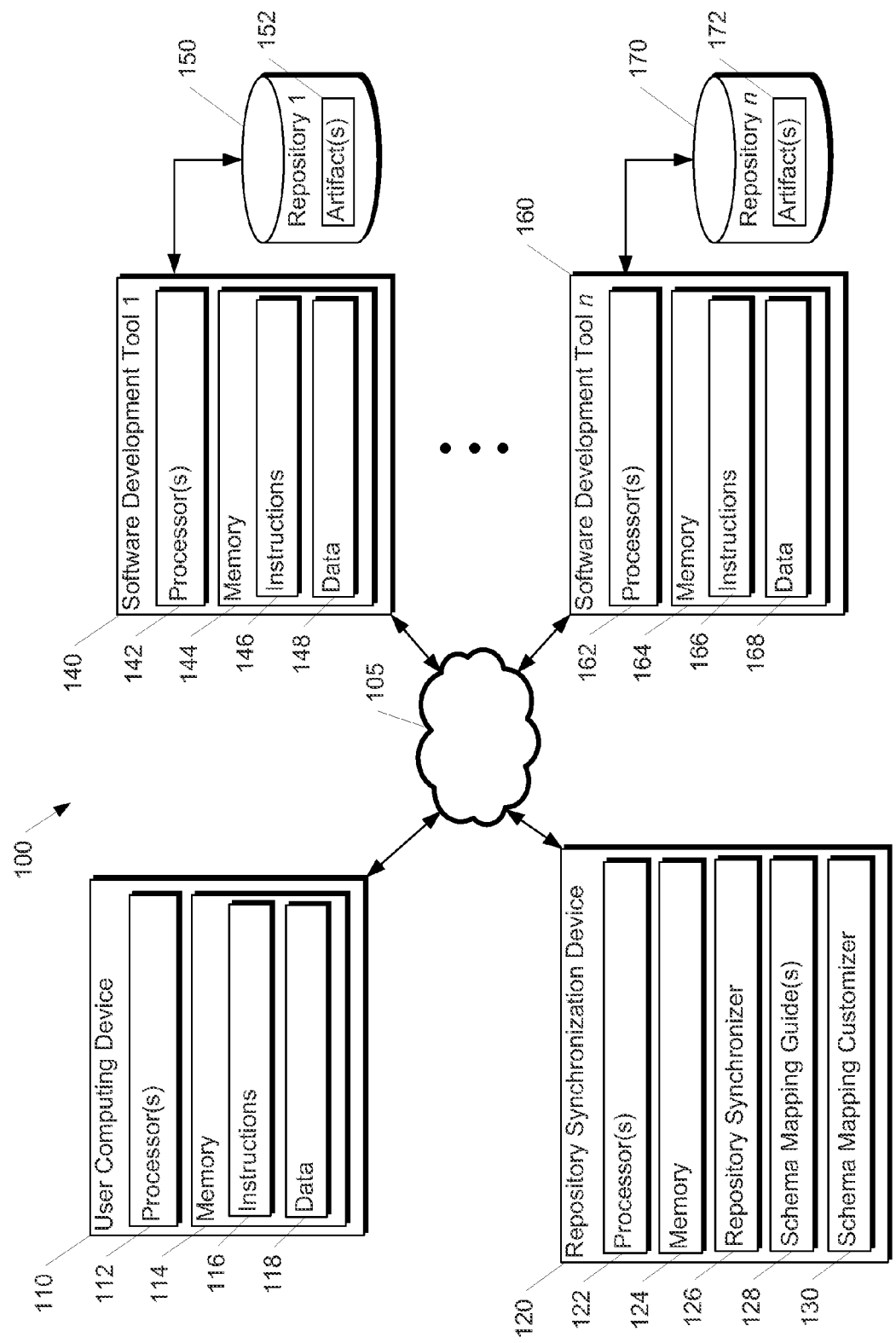
FIG. 1 is a block diagram of a system to synchronize artifact relationships, according to at least one illustrated embodiment.

FIG. 1 is a block diagram of a system 100 to synchronize artifact relationships, according to at least one illustrated embodiment. Generally, the system 100 is organized in a distributed fashion in which a user computing device 110 interacts with a repository synchronization device 120, a first software development tool 140, and an n-th software development tool 160 via a communications network 105.

The system 100 can be used to develop software products. For example, a user can employ user computing device 110 to interact with the first software development tool 140 to perform aspects of the software development process that are enabled by the first software development tool 140. Although only a single user computing device 110 is shown in FIG. 1, the system 100 can include any number of user computing devices via which different individuals in an organization interact with available software development tools (e.g., tools 140 and 160) to develop software products.

The user computing device 110 includes a processor 112 and a memory 114. The processor 112 can be one processor or a plurality of processors that are operatively coupled. The processor 112 can be any processing device, such as a microprocessor, microcontroller, integrated circuit, circuitry that implements computer logic, or some combination thereof. The memory 114 can include any non-transitory information storage device, including, but not limited to, RAM, ROM, hard drives, flash drives, optical media, other memory devices, or some combination thereof. The memory 114 can store information accessible by processor 112, including instructions 116 that can be executed by processor 112. The instructions 116 can be any set of instructions that when executed by the processor 112, cause the processor 112 to provide desired functionality. The memory 114 can also store data 118.

Software development tools 140 and 160 may provide different features, functions, or data representations that are useful for certain aspects or stages of the development process or are useful to different individuals with different roles within the organization. For example, a business analyst may use the first software development tool 140 to perform her functions within the organization while a developer uses the n-th development tool 160 to perform his functions within the organization.

Although only two software development tools are explicitly shown, the system 100 may include any number of different or similar software development tools. For example, system 100 can include software development tools that provide application lifecycle management, project portfolio management, requirements management, development tools, quality management, IT assessment or service management, operations tools, or tools designed for other aspects of the development cycle. System 100 can include more than one tool from each category of tools provided above.

The software development tools 140 and 160 can also be instances of the same software development tool. Thus, the system 100 may include any number of software development tools or other programs or devices that may be unique from each other, instances of the same program or device, or some combination thereof.

Furthermore, although the present disclosure is discussed with reference to software development tools, the teachings and components of the present disclosure can be applied to many other contexts as well. In particular, alternatively or in addition to software development tools 140 and 160, the system 100 can further include any number of other tools, programs, applications, or devices that perform or enable operations other than the development of software. For example, the present disclosure can be applied to synchronize artifacts across repositories associated with any group of arbitrary tools, programs, applications, or devices, including for example, email clients, employee management tools, asset management tools, resource allocation or planning tools, manufacturing flow tools, inventory management tools, document management systems, personal information organization systems, financial management systems, gaming systems, mapping systems, etc. In particular, the repository synchronization device 120 can synchronize artifacts and artifact relationships included in repositories associated with any many different resources.

Referring again to FIG. 1, each development tool 140 and 160 includes a processor (142 and 162, respectively) and a non-transitory memory (144 and 164, respectively). Similar to processor 112 and memory 114, processors 142 and 162 can respectively be any processing device or combination of such devices. Likewise, memory 144 and memory 164 can respectively include any information storage device or combination of such devices. Each memory 144 and 164 can store instructions (146 and 166, respectively) and data (148 and 168, respectively).

In some implementations, software development tools 140 and 160 respectively include one or more server computing devices. The server computing devices can be arranged according to any computer architecture, including parallel, sequential, and/or distributed computing architectures. The server computing devices can provide the software development functionality as a service over network 105. In other implementations, software development tools 140 and 160 can be executed locally at the user computing device 110.

Each software development tool included in system 100 stores a plurality of artifacts in an associated repository. For example, the first software development tool 140 stores a plurality of artifacts 152 in a first repository 150 while the n-th development tool 160 stores artifacts 172 in repository 170. Generally, artifacts are representations of aspects of the software development process. Artifacts can include, without limitation, a task, a goal, a user story, an epic, a defect, a requirement, an issue, a test, a feature, a bug, an asset, a file, a software package, or other representations of aspects of the development process.

Relationships can be defined between artifacts. As will be discussed further with reference to FIGS. 3 and 4, relationships can be internal relationships between artifacts contained within the same repository or external relationships between artifacts respectively contained in different repositories.

Each repository can be a single database or a plurality of databases. In instances employing a plurality of databases, such databases can be co-located or can be distributed at different locations. Each repository can be co-located with its corresponding development tool or can be located remotely and accessed over the network 105 or other connection. In some implementations, the repository for each development tool is stored in a local non-transitory memory associated with one or more servers implementing such development tool.

Repository synchronization device 120 synchronizes artifacts between repositories 150 and 170. In particular, repository synchronization device 120 synchronizes artifact relationships between repositories 150 and 170. In some instances, the repository synchronization device instructs or commands (e.g., via an application programming interface (API)) the software development tools 140 and 160 to make changes to or otherwise alter data contained within their respective repositories 150 and 170.

The repository synchronization device 120 includes a processor 122 and a memory 124. The processor 122 can be one processor or a plurality of processors that are operatively coupled. The processor 122 can be any processing device, such as a microprocessor, microcontroller, integrated circuit, other device that implements computer logic, or some combination thereof. The memory 124 can include any non-transitory information storage device, including, but not limited to, RAM, ROM, hard drives, flash drives, optical media, other memory devices, or some combination thereof. The memory 124 can store information accessible by processor 122, including instructions that can be executed by processor 122. The instructions can be any set of instructions that when executed by the processor 122, cause the processor 122 to provide desired functionality. The memory 124 can also store data.

In some implementations, repository synchronization device 120 includes one or more server computing devices. The server computing devices can be arranged according to any computer architecture, including parallel, sequential, and/or distributed computing architectures. The server computing devices can interact with software development tools 140 and 160 over network 105 to synchronize artifacts 152 and 172. In other implementations, repository synchronization device 120 is executed locally at the user computing device 110.

The repository synchronization device 120 includes a repository synchronizer 126, one or more schema mapping guides 128, and a schema mapping customizer 130.

The repository synchronization device 120 implements the repository synchronizer 126 to synchronize artifacts across a plurality of repositories. In particular, the repository synchronization device 120 implements the repository synchronizer 126 to synchronize artifact relationships across a plurality of repositories. For example, repository synchronization device can implement repository synchronizer 126 to perform aspects of methods 500 and 600 of FIG. 5 and FIGS. 6A through 6C, respectively. In some implementations, the repository synchronizer 126 interacts with the software development tools 140 and 160 using vendor-approved or vendor-supplied APIs respectively associated with the development tools 140 and 160.

In some implementations, the repository synchronization device 120 implements the repository synchronizer 126 in an automated or autonomous fashion. For example, synchronization may be performed periodically not responsive to human prompting or may be performed autonomously upon receiving at the device 120 an indication from a software development tool that an attribute (e.g., relationship) of a particular artifact has been altered. Alternatively, the repository synchronization device 120 implements the repository synchronizer 126 responsive to human prompting or according to a defined schedule. In some implementations, the repository synchronization device 120 implements the repository synchronizer 126 according to one or more user-defined conditions that specify certain rules, logic, times, repositories, and/or artifact or relationship types according to which conditional synchronization should (or should not) be performed.

In some implementations, the repository synchronizer 126 includes processor-executable instructions stored in or loaded into memory 124 and executed by processor 122. In other implementations, the repository synchronizer 126 includes one or more circuits (e.g., integrated circuits), logic components, or other items of computer hardware configured to implement computer logic or perform other functionality. In other implementations, the repository synchronizer 126 can be implemented using some combination of processor-executable instructions and circuitry.

Each of the schema mapping guides 128 provides one or more relationship mappings between relationship types in different repositories. In particular, each software development tool and corresponding repository included in system 100 may have a set of available relationship types to describe relationships associated with artifacts included in its repository. The sets of available relationship types associated with different repositories may be identical, different, overlapping, and/or non-overlapping. For example, if the artifacts are synchronized across multiple instances of the same tool, the corresponding sets of available relationship types may be identical. Alternatively, the tool may allow the user of each particular instance to customize or define its corresponding set of available relationship types and, therefore, the corresponding sets of available relationship types may be non-identical. Further, the sets of available relationship types can include subsets that are artifact type-specific.

As one example, in the first software development tool 140, the business analyst may represent that a requirement artifact is "blocked by" a user story. However, in the n-th software development tool 160, the "blocked by" relationship type may be unavailable, as the development tool 160 uses a second, different set of relationship types. The repository synchronizer 126 uses the schema mapping guides 128 to synchronize artifact relationships between repositories. In particular, the repository synchronizer 126 uses the one or more relationship mappings provided by a particular schema mapping guide associated with two particular repositories to determine a target relationship type to which a source relationship type should be mapped. For example, a particular schema mapping guide may indicate that the "blocked by" relationship type available in the first repository 150 maps to a "related to" relationship type in the n-th repository 170. Therefore, the repository synchronizer 126 will synchronize the "blocked by" relationship type in the first repository 152 to the "related to" relationship type in the n-th repository 170, as indicated by the corresponding schema mapping guide 128.

The repository synchronization device 120 implements the schema mapping customizer 130 to allow a user to customize one or more of the schema mapping guides 128. In particular, the repository synchronization device 120 implements the schema mapping customizer 130 to revise, create, delete, copy, update, or otherwise customize one or more of the schema mapping guides 128 based at least in part on user input received via user computing device 110. For example, schema mapping customizer 130 can interact with user computing device 110 to provide at the user computing device 110 a user interface by which a user adjusts, defines, or otherwise customizes one or more of the relationship mappings provided by a particular schema mapping guide 128. In some implementations, the schema mapping customizer 130 stores one or more predefined and/or user-defined or user-customized schema mapping guide templates that may be applied to particular repositories or used by a user as a template for additional customization of a particular schema mapping guide 128.

In some implementations, the schema mapping customizer 130 includes processor-executable instructions stored in or loaded into memory 124 and executed by processor 122. In other implementations, the schema mapping customizer 130 includes one or more circuits (e.g., integrated circuits), logic components, or other items of computer hardware configured to implement computer logic or perform other functionality. In other implementations, the schema mapping customizer 130 can be implemented using some combination of processor-executable instructions and circuitry.

Network 105 can be any type of communications network, such as a local area network (e.g., intranet), wide area network (e.g., Internet), or some combination thereof and can include any number of wired or wireless links. In general, communication between the components of system 100 via network 105 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Thus, the repository synchronization device 120 enables collaboration by synchronizing artifacts and artifact relationships across repositories associated with different software development tools employed by different individuals within an organization. Such may advantageously eliminate information silos around each functional discipline, while maintaining and enhancing existing tool infrastructure. By allowing individuals to operate within their development tool of choice while receiving continual updates from other development tools, software product development and deployment is strengthened and investment in existing tools is reinforced. Further, the schema mapping customizer 130 enables relationship mapping customization that increases the robustness of the infrastructure and allows for organization and/or project-specific relationship mapping configurations to be specified.

Due to the inherent flexibility of computer-based systems, a great variety of possible configurations, combinations, and divisions of tasks and functionality between and among the components of the system 100 are possible. For instance, system 100 can be implemented using a single computing device or across multiple computing devices, as shown in FIG. 1. Tasks shown as being performed at a certain device can instead be performed at other devices. Any combination of general-purpose and special-purpose computing devices can be used.

Figure 2:
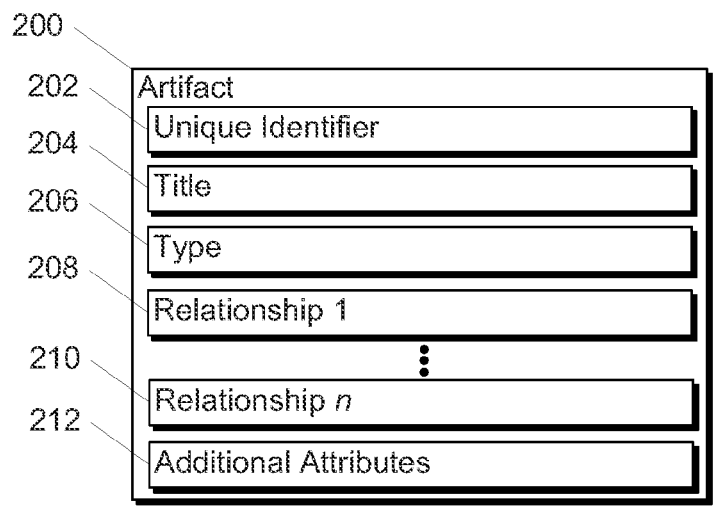
FIG. 2 is a block diagram of an artifact data structure, according to at least one illustrated embodiment.

FIG. 2 is a block diagram of an example data structure of an artifact 200, according to at least one illustrated embodiment. As shown in FIG. 2, artifact 200 includes a plurality of attribute fields that store information that describes various attributes of the artifact 200. For example, the attribute fields can store information that includes a unique identifier 202, a title 204, an artifact type 206, and any additional attributes 212 for which storage of data may be advantageous (e.g., creation date, editing date, comments, etc.).

The data structure for the artifact 200 also includes one or more attribute fields that respectively store information that describes one or more relationships between the artifact 200 and one or more respective other artifacts. As an example, a first relationship field 208 stores information that describes a first relationship between the artifact 200 and a first artifact. Likewise, an n-th relationship field 210 stores information that describes an n-th relationship between the artifact 200 and an n-th artifact.

In some implementations, a component of the system 100 (e.g., the repository 126 or the first software development tool 140) creates the relationship fields responsive to creation of the corresponding relationship. In other implementations, a component of the system 100 creates the relationship fields upon creation of the artifact 200 and the relationship fields simply remain null until populated with particular relationships.

In some implementations, each relationship field stores a relationship type associated with the corresponding relationship. As an example, the first relationship field 208 can store information that describes a first relationship type associated with the first relationship between the artifact 200 and the first artifact. In other implementations, the first relationship type is stored in an additional attribute field that is different than the first relationship field 208.

In yet further implementations, the data structure for each artifact 200 includes an attribute field for each relationship type available within the corresponding repository. For example, if the artifact 200 exists within a repository associated with a software development tool for which six relationship types are available, then the data structure may include at least six relationship fields that respectively correspond to the six relationship types. If the artifact 200 has a relationship with a first artifact of a particular relationship type, then the component of the system 100 populates the corresponding relationship field with the identity of the first artifact. If the artifact 200 has relationships of the same relationship type with plural artifacts, then the component of the system 100 creates multiple relationship fields corresponding to the same relationship type. Alternatively, the component of the system 100 may create multiple subfields within a single relationship field that corresponds to the particular relationship type. As yet another example, the identities of each of the artifacts for which artifact 200 has a relationship of such relationship type may be stored as a string or set of identifiers within a single relationship field. Other data structures may be used as well.

Figure 3:
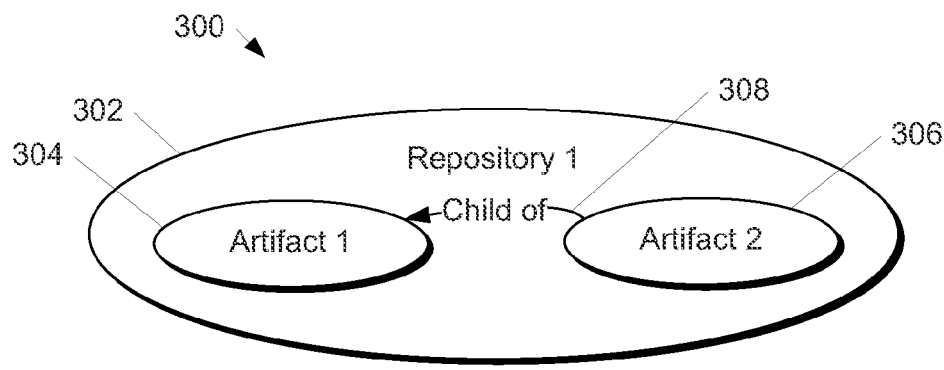
FIG. 3 is a graphical diagram of an internal artifact relationship, according to at least one illustrated embodiment.

FIG. 3 is a graphical diagram 300 of an internal artifact relationship, according to at least one illustrated embodiment. Diagram 300 shows a first repository 302 associated with software development tool. The first repository 302 stores a first artifact 304 and a second artifact 306. A defined relationship 308 exists between the artifacts 306 and 304. Because the first and second artifacts 304 and 306 are both included within the first repository 302, the relationship 308 is denominated as an internal relationship within the repository 302.

The relationship 308 indicates that the second artifact 306 is a child of the first artifact 304. Thus, the relationship 308 is of the "child of" relationship type. An attribute field associated with the second artifact 306 stores data that describes the relationship 308. In some implementations, an attribute field associated with the first artifact 304 also stores data that describes the relationship 308. For example, the data may describe that the second artifact 306 is a child of the first artifact 304 or that the first artifact 304 is a parent of the second artifact 306. However, in other implementations, the data structure of the first artifact 304 does not store data that describes the relationship 308.

Figure 4:
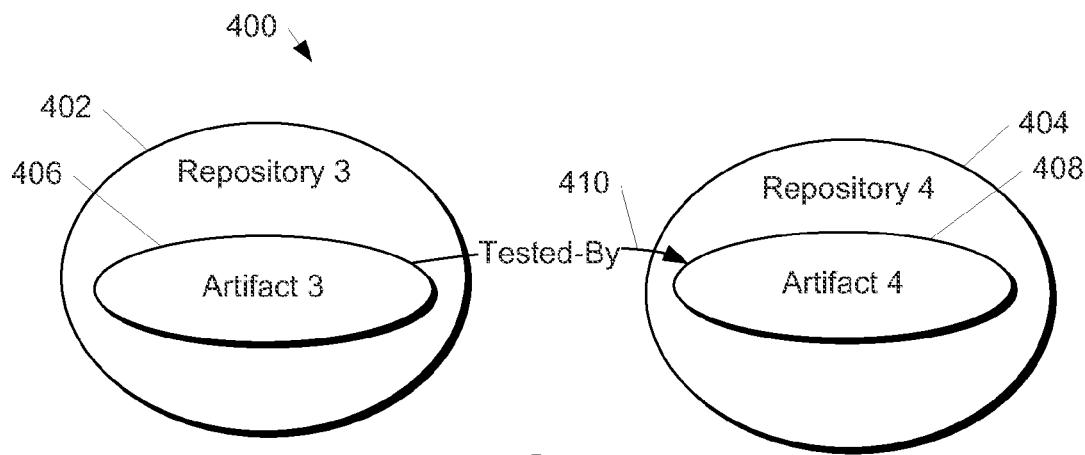
FIG. 4 is a graphical diagram of an external artifact relationship, according to at least one illustrated embodiment.

FIG. 4 is a graphical diagram 400 of an external artifact relationship, according to at least one illustrated embodiment. Diagram 400 shows a third repository 402 associated with a third software development tool and a fourth repository 404 associated with a fourth software development tool. Third repository 402 stores a third artifact 406 and fourth repository 404 stores a fourth artifact 408. A defined relationship 410 exists between the artifacts 406 and 408. Because the third and fourth artifacts 406 and 408 are respectively included in different repositories, the relationship 410 is an external relationship.

The relationship 410 indicates that the third artifact 406 is tested-by the fourth artifact 408. Thus, the relationship 410 is of the "tested-by" relationship type. An attribute field associated with the third artifact 406 stores data that describes the relationship 410. In some implementations, an attribute field associated with the fourth artifact 408 also stores data that describes the relationship 410. For example, the data may describe that the third artifact 406 is tested-by the fourth artifact 408 or that the fourth artifact 408 tests the third artifact 406. However, in other implementations, the data structure of the fourth artifact 408 does not store data that describes the relationship 410.

Figure 5:
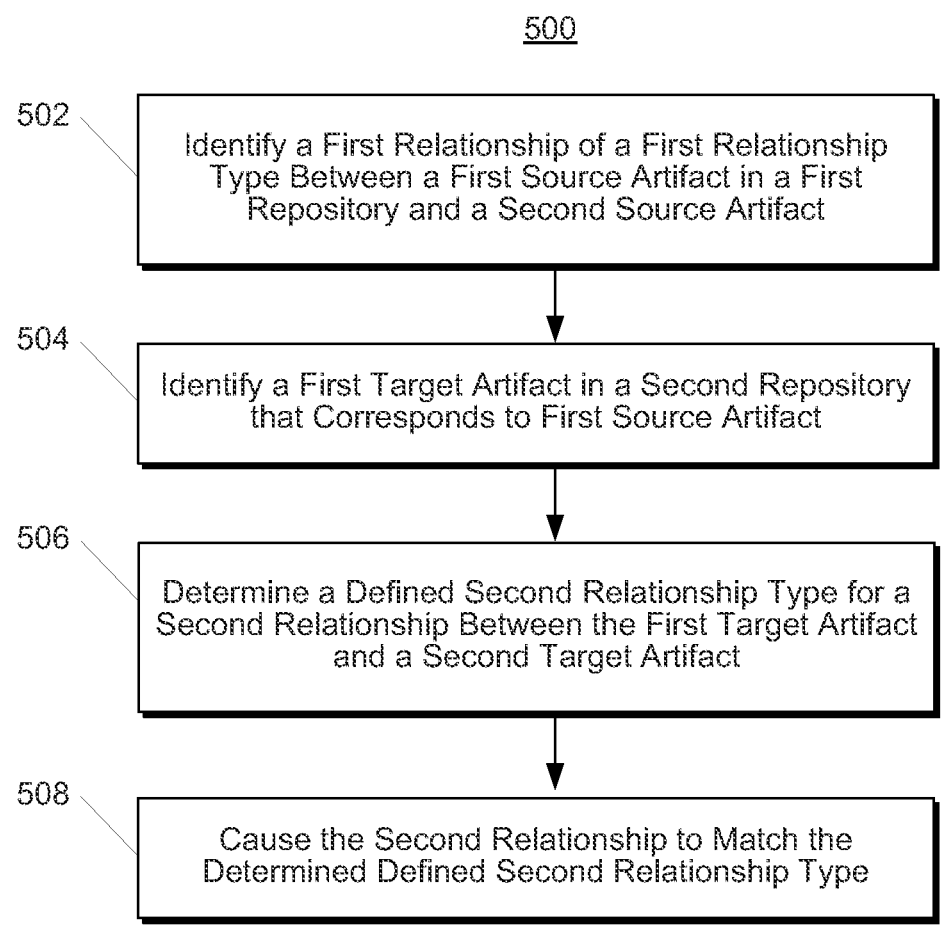
FIG. 5 is a flow chart diagram showing a method to synchronize artifact relationships, according to at least one illustrated embodiment.

FIG. 5 is a flow chart diagram showing a method 500 to synchronize artifact relationships, according to at least one illustrated embodiment. Although method 500 is discussed as being performed by repository synchronizer 126 of FIG. 1, in some implementations, other components or combinations of components of the system 100 perform aspects of method 500 in addition or alternatively to repository synchronizer 126. For example, the repository synchronizer 126 may instruct or command a particular software development tool to perform desired operations on behalf of the repository synchronizer 126. Method 500 begins at 502.

At 502, the repository synchronizer 126 identifies a first relationship of a first relationship type between a first source artifact in a first repository and a second source artifact. The first repository is associated with a first software development tool. The second source artifact can be included in the first repository or included in a repository different than the first repository.

In some implementations, identifying the first relationship at 502 includes receiving an indication of an alteration of one or more data fields associated with the first source artifact and scanning the data fields of the first source artifact to identify as unprocessed the first relationship. For example, the indication of the alteration of the one or more data fields may be received from a software development tool that stores the first source artifact. Alternatively, identifying the first relationship at 502 can include automatically scanning the data fields of the first source artifact to identify the alteration of the one or more data fields without receiving an indication from the software development tool. The alteration of the one or more data fields may include, for example, alteration of data responsive to a creation, a change, or a deletion of the first relationship.

At 504, the repository synchronizer 126 identifies a first target artifact in a second repository that corresponds to the first source artifact. The second repository is associated with a second software development tool that is different from the first software development tool.

The first target artifact in the second repository may have been previously mapped to or otherwise synchronized with respect to the first source artifact in the first repository. Thus, in some implementations, identifying the first target artifact at 504 includes accessing or otherwise reading previously stored data that indicates that the first source artifact is mapped to the first target artifact. For example, such data may be stored in an attribute field associated with the first source artifact. As another example, the repository synchronizer 126 can consult a roster or manifest of artifact mappings to identify that the first target artifact in the second repository corresponds to the first source artifact in the first repository.

At 506, the repository synchronizer 126 determines a defined second relationship type for a second relationship between the first target artifact and a second target artifact. The second target artifact can be included in the second repository or included in a repository different than the second repository. The second target artifact may have been previously mapped to the second source artifact.

In some implementations, the defined second relationship type is determined at 506 based at least in part on a schema mapping guide that provides a relationship mapping from the first relationship type in the first repository to the defined second relationship type in the second repository. As one example, upon identifying the first and second repositories, a particular schema mapping guide associated with such first and second repositories is obtained. The obtained schema mapping guide provides a relationship mapping from the first relationship type in the first repository to the defined second relationship type in the second repository. Therefore, determining the second relationship type at 506 can include reading and/or applying the relationship mapping provided by the schema mapping guide.

In some implementations, the relationship mapping provided by the schema mapping guide is a user-defined relationship mapping. For example, the relationship mapping provided by schema mapping guide may have been customized through the use of a schema mapping customizer.

In other implementations, the relationship mapping provided by the schema mapping guide is specific not only to the first and second repository but also to the artifact type of the first source artifact, the artifact type of the second source artifact, the artifact type of the first target artifact, and/or the artifact type of the second target artifact. Thus, the schema mapping guide may provide a mapping from a unique set of artifact types and relationship types to another unique set of artifact types and relationship types.

In some implementations of the present disclosure, the relationship mappings provided by schema mapping guides specify different mappings for relationships according to whether the first relationship is an internal relationship or an external relationship. Therefore, in some implementations, determining the defined second relationship type at 506 includes determining whether the first relationship between the first source artifact and the second source artifact is an internal relationship within the first repository.

As one example, in response to determining that the first relationship is an internal relationship within the first repository, determining the second relationship type at 506 can include determining whether the second relationship is to be an internal relationship within the second repository. If the second relationship is to be an internal relationship within the second repository, then the repository synchronizer 126 can perform a check at 506 to ensure that the second target artifact presently exists within the second repository. Such may ensure that the second target artifact is created if needed. For example, one or more of the first source artifact, the first relationship, the second target artifact, or other items may be marked as pending until the second target artifact is created.

As another example, if the second relationship is to be an external relationship, then the repository synchronizer 126 can generate a resource locator that describes a location of the second source artifact within the first repository or a third repository. For example, the resource locator can be a uniform resource locator (URL) that provides access to the location of the second source artifact within the first repository or the third repository. The URL may be user-selectable.

As yet another example, if it is determined at 506 that the first relationship is an external relationship, then certain other actions may be taken to synchronize the first and second relationships, as will be discussed further with respect to 508.

At 508, the repository synchronizer 126 can cause the second relationship to match the determined defined second relationship type. For example, an attribute field or other data item associated with the first target artifact and/or the second target artifact may be adjusted, created, or updated to cause the second relationship to have the second relationship type.

As an example, the repository synchronizer 126 can populate an attribute field of the first target artifact that is particularly associated with the second relationship type with the identity of second target artifact or otherwise amended to describe the second relationship. Alternatively or additionally, the repository synchronizer 126 can populate an attribute field of the second target artifact that is particularly associated with the second relationship type with the identity of first target artifact or otherwise amended to describe the second relationship. In some implementations, the repository synchronizer 126 instructs the appropriate software development tool to populate the appropriate attribute field.

Thus, causing the second relationship to match the determined defined second relationship type can include establishing the second relationship of the determined defined second relationship type; changing the second relationship to the determined defined second relationship type from a third relationship type; determining that the second relationship of the second relationship type already exists between the first and second target artifacts and, therefore, leaving the second relationship as the second relationship type; or other actions to cause the second relationship to match the determined defined second relationship type.

Furthermore, as discussed above, in certain implementations, one or more components of the system 100 can perform different actions to synchronize relationships according to whether the relationships to be synchronized are internal-to-internal, internal-to-external, or external-to-external. As one example, if it is determined at 506 that the first relationship is internal to the first repository, but the second relationship is to be external, then causing the second relationship to match the determined defined second relationship type at 508 can include associating a resource locator that describes the location of the second source artifact with the first target artifact as the second relationship. For example, the resource locator can be stored in an attribute field that corresponds to or otherwise describes the second relationship.

As another example, if it is determined at 506 that the first relationship is external to the first repository, then causing the second relationship to match the determined defined second relationship type at 508 can include copying a resource locator that describes a location of the second source artifact from an attribute field of the first source artifact to an attribute field of the first target artifact.

Method 500 may terminate after 508, for example until invoked again.

Figure 6A:
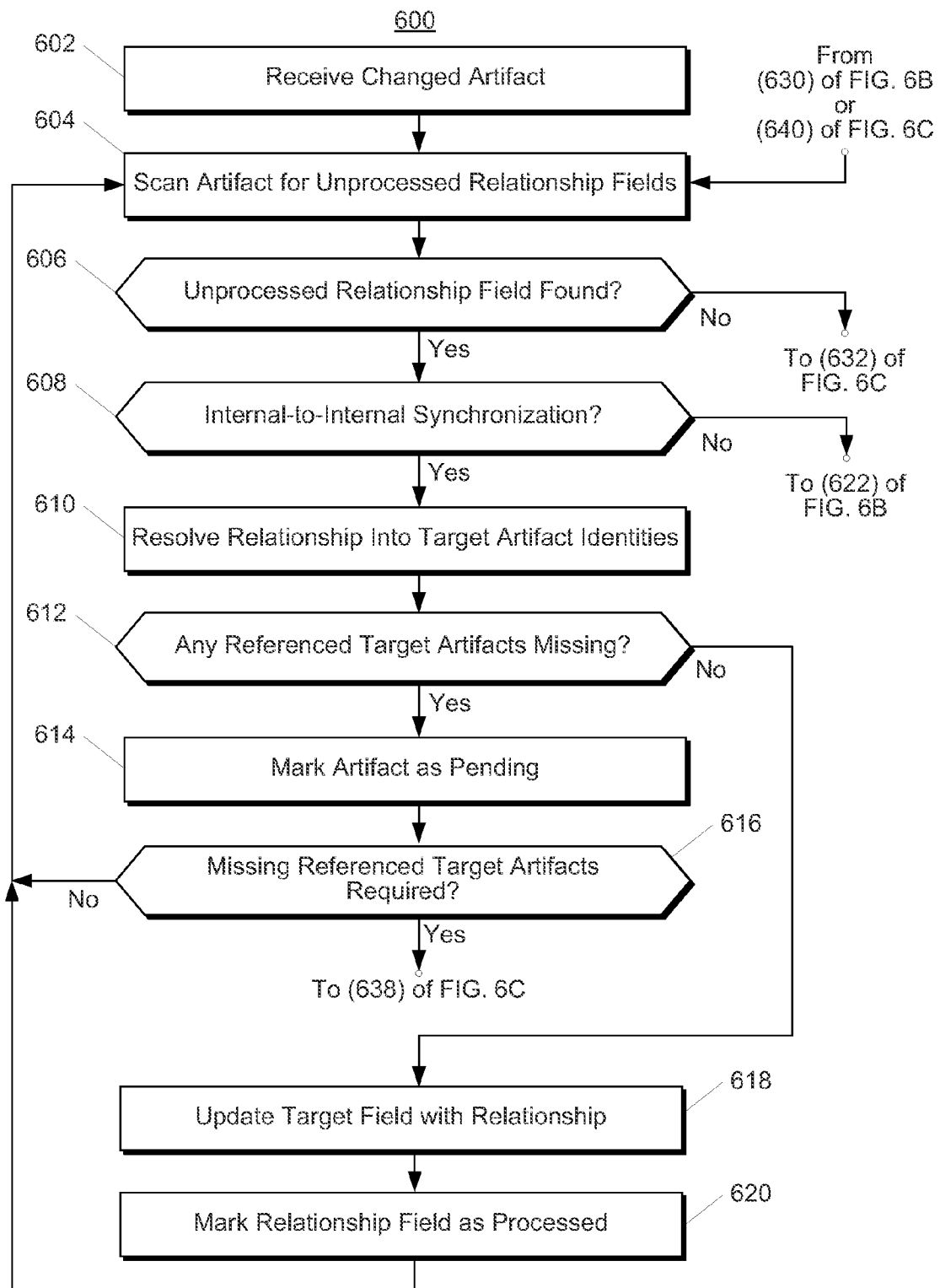
FIGS. 6A-6C are flow chart diagrams showing a method to synchronize artifact relationships, according to at least one illustrated embodiment.
Figure 6B:
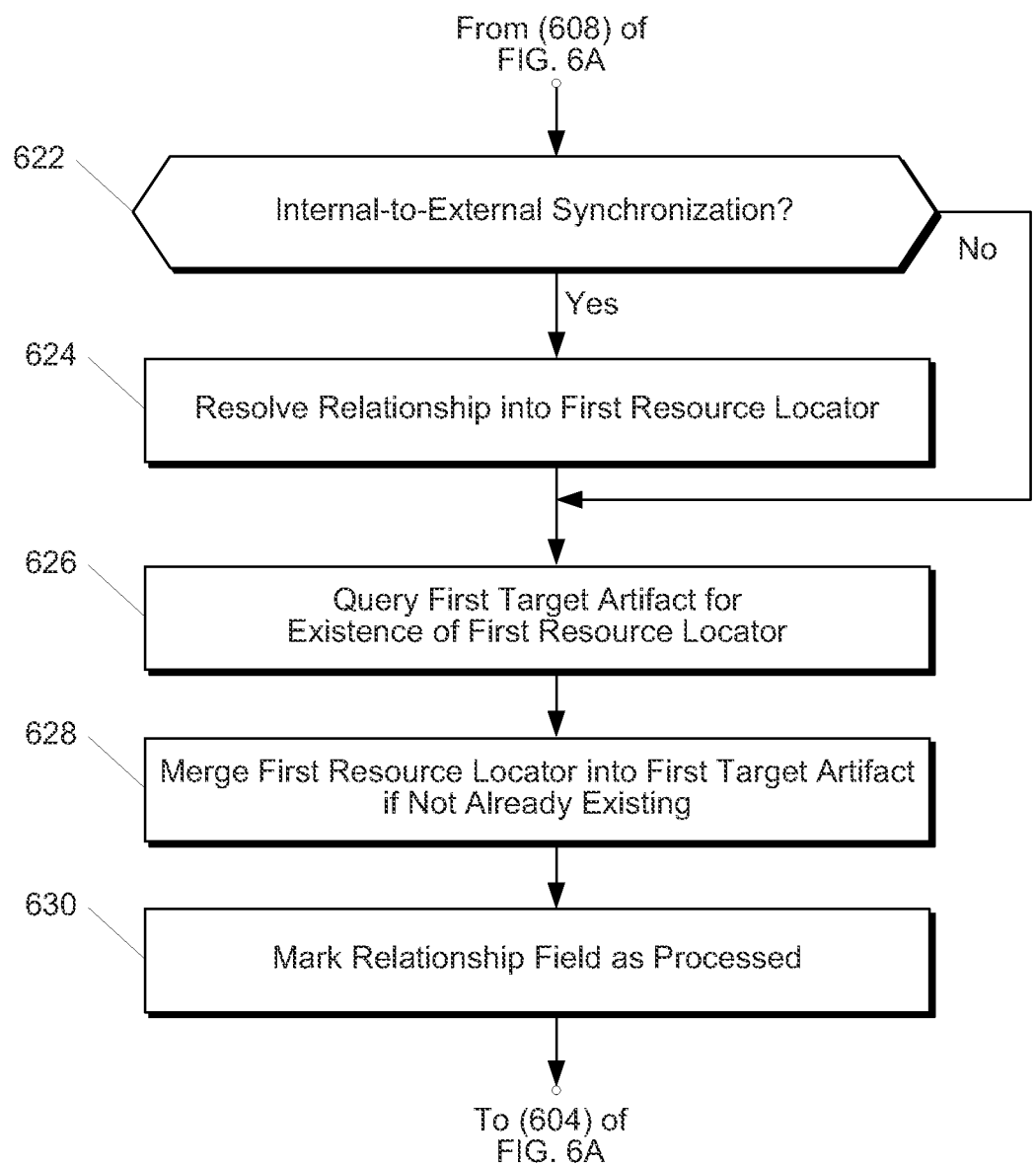
Figure 6C:
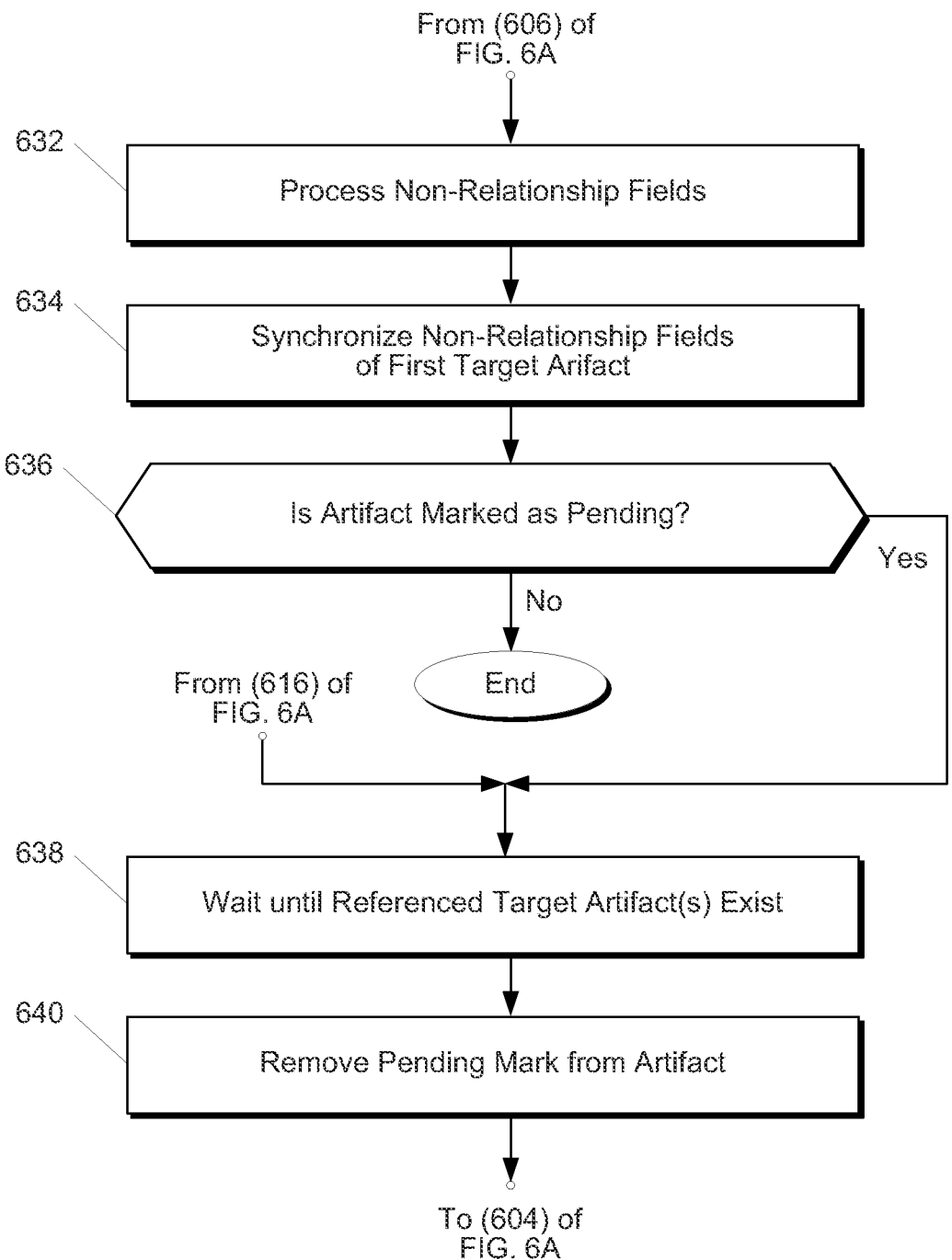

FIGS. 6A-6C are flow chart diagrams showing a method 600 to synchronize artifact relationships, according to at least one illustrated embodiment. Although method 600 is discussed as being performed by repository synchronizer 126 of FIG. 1, in some implementations, other components or combinations of components of the system 100 perform aspects of method 500 in addition or alternatively to repository synchronizer 126. For example, the repository synchronizer 126 may instruct or command a particular software development tool to perform desired operations on behalf of the repository synchronizer 126. Method 600 begins at 602.

At 602, the repository synchronizer 126 receives a changed artifact. For example, repository synchronizer 126 can observe (e.g., via periodic and autonomous scanning) that one or more attribute fields of a particular artifact have been altered. Alternatively, a software development tool can actively provide an indication that one or more attribute fields of a particular artifact have been altered to the repository synchronizer 126.

At 604, the repository synchronizer 126 scans the artifact for unprocessed relationship fields. For example, the repository synchronizer 126 can scan the attribute fields of the changed artifact to identify whether one or more relationship fields have changed and remain unprocessed.

At 606, the repository synchronizer 126 determines whether one or more unprocessed relationship fields are found. For example, the results of the scan performed at 604 may be considered at 606. If it is determined at 606 that no unprocessed relationship fields were found, then method 600 proceeds to 632 of FIG. 6C.

However, if it is determined at 606 that at least one unprocessed relationship field is found, the method 600 proceeds to 608. For example, the at least one unprocessed relationship field may describe a first relationship between the changed artifact and a second source artifact.

At 608, the repository synchronizer 126 determines whether the synchronization to be performed with respect to the unprocessed relationship field is an internal-to-internal synchronization. For example, the repository synchronizer 126 can obtain a schema mapping guide that describes one or more relationship mappings between a source repository in which changed artifact is stored and a target repository in which a first target artifact is stored. The first target artifact may have previously been mapped to the changed artifact. The obtained schema mapping guide can indicate or otherwise guide to repository synchronizer 126 to determine whether the synchronization to be performed with respect to the unprocessed relationship field is an internal-to-internal synchronization.

If it is determined at 608 that the synchronization to be performed is not an internal-to-internal synchronization, then method 600 proceeds to 622 of FIG. 6B. However, it is determined at 608 that the synchronization to be performed is an internal-to-internal synchronization, then method 600 proceeds to 610.

At 610, the repository synchronizer 126 resolves the relationship into target artifact identities. For example, a first and second target artifact may have previously been respectively mapped to the changed artifact and the second source artifact. Thus, resolving the relationship into the target artifact identities at 610 can include reading previously stored data that indicates that the changed artifact is mapped to the first target artifact. As another example, a roster or manifest of artifact mappings can be consulted at 610 to determine the identities of the target artifacts to which the unprocessed relationship should be synchronized. As the synchronization is an internal-to-internal synchronization, the target artifacts should reside within a single target repository.

At 612, the repository synchronizer 126 determines whether any referenced target artifacts are missing. For example, the target repository can be accessed or otherwise analyzed at 612 to ensure that both the first and second target artifacts currently exist within the target repository. More particularly, a referenced target artifact can be missing if it has not yet been synchronized from the source repository (i.e., generated within the target repository on the basis of being synchronized to the changed artifact, the second source artifact, or another artifact).

If it is determined that 612 that at least one referenced target artifact is missing, then method 600 proceeds to 614. However, it is determined that 612 that no referenced target artifacts are missing, then method 600 proceeds to 618.

At 618, the repository synchronizer 126 updates a target field to reflect the relationship. In particular, an attribute field associated with the first target artifact can be created, updated, deleted, or otherwise adjusted to describe a second relationship between the first target artifact and the second target artifact that is synchronized with respect to the first relationship described by the unprocessed relationship field. The second relationship is of a second relationship type (e.g., as indicated by a scheme mapping guide). Alternatively or additionally, an attribute field associated with the second target artifact can be adjusted to describe the second relationship. In such fashion, the second relationship is synchronized to the first relationship.

At 620, the repository synchronizer 126 marks the relationship field as processed. After 620, method 600 returns to 604 and again scans the artifact for unprocessed relationship fields.

Returning to 612 of FIG. 6A, if it is determined at 612 that one or more referenced target artifacts are missing, then method 600 proceeds to 614.

At 614, the repository synchronizer 126 marks the changed artifact as pending. For example, a flag or other data item of the artifact may be set (e.g., adjusted to a certain value) to indicate that the artifact is pending. The flag may be a data item held within the repository synchronization device 120 or may be persisted to the artifact in its respective repository (e.g., via use of a corresponding API).

At 616, the repository synchronizer 126 determines whether any of the missing referenced target artifacts are required. For example, a referenced target artifact is required if another artifact and/or the second relationship cannot exist without the referenced target artifact. As one example, in some implementations, a parent artifact must exist prior to a "child-of" relationship being established at a given artifact. In other words, the child's reference to the parent requires that the parent artifact exist.

If it is determined at 616 that no missing referenced target artifacts are required, then method 600 returns to 604 and again scans the artifact for unprocessed relationship fields. However, if it is determined at 616 that at least one missing referenced target artifact is required, then method 600 proceeds to 638 of FIG. 6C.

Returning to 608 of FIG. 6A, if it is determined at 608 that the synchronization to be performed is not an internal-to-internal synchronization, then method 600 proceeds to 622 of FIG. 6B.

Referring now to FIG. 6B, at 622, the repository synchronizer 126 determines whether the synchronization to be performed with respect to the unprocessed relationship field is an internal-to-external synchronization. For example, the repository synchronizer 126 can analyze an obtained schema mapping guide to determine whether the synchronization to be performed with respect to the unprocessed relationship field is an internal-to-external synchronization.

If it is determined at 622 that the synchronization to be performed is not an internal-to-external synchronization, then method 600 proceeds to 626. However, if it is determined at 622 that the synchronization to be performed is an internal-to-external synchronization, then method 600 proceeds to 624.

At 624, the repository synchronizer 126 resolves the relationship into a first resource locator. For example, the first resource locator can describe the location of the second target artifact. Resolving the relationship into the first resource locator at 624 can include generating the first resource locator. In some implementations, the first resource locator is a user-selectable URL that provides access to the location of the second target artifact. For example, a user computing device that executes the URL may be directed to an interface of a software development tool associated with the repository in which the second target artifact is stored.

At 626, the repository synchronizer 126 queries the first target artifact to determine whether the first resource locator already exists at the first target artifact. For example, the attribute fields of the first target artifact can be scanned to determine the existence or non-existence of the first resource locator within the data structure of the first target artifact.

At 628, the repository synchronizer 126 merges the first resource locator into the first target artifact if it does not already exist at the first target artifact. For example, the first resource locator can be stored in or otherwise populate an attribute field associated with the first target artifact. In particular, in some implementations, the first resource locator can populate a particular attribute field associated with a particular relationship type indicated by an associated schema mapping guide.

At 630, the repository synchronizer 126 marks the relationship field as processed. After 630, method 600 returns to 604 and again scans the artifact for unprocessed relationship fields.

Returning to 606 of FIG. 6A, if it is determined at 606 that no unprocessed relationship fields were found, then method 600 proceeds to 632 of FIG. 6C.

Referring now to FIG. 6C, at 632 the non-relationship fields are processed. For example changes to other attribute fields for attributes such as title, type, or other attributes can be scanned, recognized, and queued for processing.

At 634, the repository synchronizer 126 synchronizes the non-relationship fields of a first target artifact that corresponds to the changed artifact to reflect the non-relationship attribute changes processed at 632. For example, the attribute fields of the first target artifact that correspond to title, type, or other attributes of the first target artifact can be edited in accordance with a schema mapping guide or other synchronization guide.

At 636, the repository synchronizer 126 determines whether the artifact is marked as pending. For example, a flag or other data item can be read to determine whether the artifact is currently marked as pending.

If it is determined at 636 that the artifact is not marked as pending, then method 600 terminates, for example until invoked again. However, if it is determined at 636 that the artifact is marked as pending, then method 600 proceeds to 638. It should be noted that a determination at 616 of FIG. 6A that one or more missing referenced target artifacts are required will result in method 600 proceeding to 638 of FIG. 6C.

Referring still to FIG. 6C, method 600 pauses at 638 until the referenced target artifacts exist. For example, the repository synchronizer 126 may perform, sequentially or in parallel, additional methods or routines to generate missing artifacts in certain repositories. Thus, if a referenced target artifact is missing, then at 638 the method 600 pauses until such additional method or routine generates the missing artifact(s). Likewise, if a changed artifact is marked as pending, such may indicate that a relationship of the changed artifact may have yet to be fully synchronized on the basis of one or more missing referenced target artifacts. Therefore, pausing at 638 allows for such referenced target artifacts to come into existence prior to successive iterations of the artifact relationship synchronization process.

At 640, the repository synchronizer 126 removes the pending mark from the artifact. After 640, method 600 returns to 604 and again scans the artifact for unprocessed relationship fields.

Figures 7A, 7B:
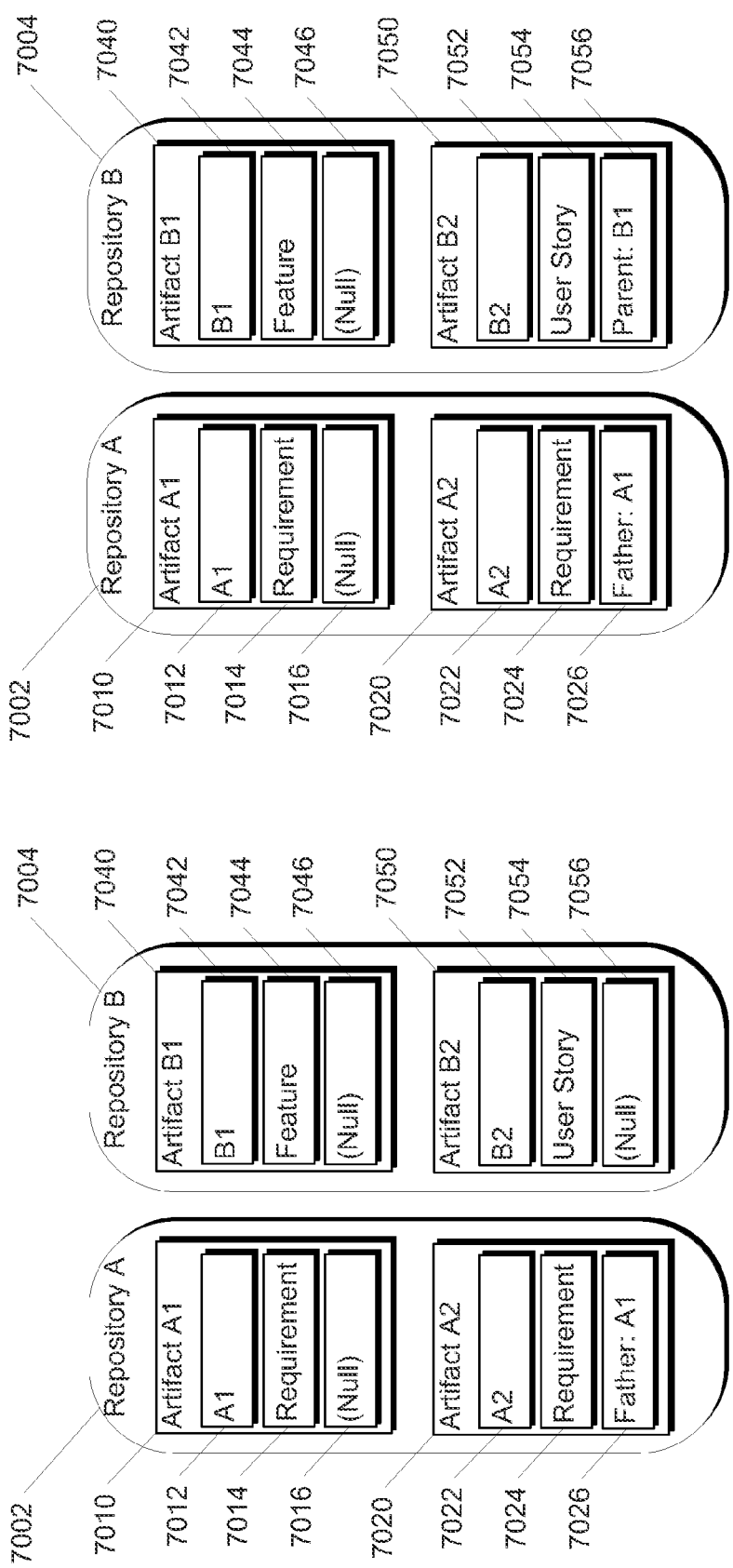
FIGS. 7A and 7B are block diagrams respectively showing artifacts before and after an internal-to-internal synchronization, according to at least one illustrated embodiment.

FIGS. 7A and 7B are block diagrams respectively showing artifacts before and after an internal-to-internal synchronization, according to at least one illustrated embodiment. In particular, FIG. 7A shows Repository A 7002 and Repository B 7004 prior to an internal-to-internal synchronization while FIG. 7B shows Repository A 7002 and Repository B 7004 after the internal-to-internal synchronization.

Referring first to FIG. 7A, Repository A 7002 stores Artifact A1 7010 and Artifact A2 7020.

Artifact A1 7010 includes an identifier field 7012 (populated with identifier "A1"), an artifact type field 7014 (populated with artifact type "requirement"), and a relationship field 7016 that is null. Likewise, Artifact A2 7020 includes an identifier field 7022 (populated with identifier "A2"), an artifact type field 7024 (populated with artifact type "requirement"), and a relationship field 7026 that is populated with data that indicates Artifact A1 7010 is the father of Artifact A2 7020. As discussed above with respect to FIG. 2, the data structure for each artifact can include multiple relationship fields that respectively correspond to different available relationship types. However, a single relationship field is depicted for each artifact in FIG. 7A and the Figures that follow for ease of presentation and understanding.

Referring again to FIG. 7A, the relationship field 7026 of Artifact A2 has recently been changed to reflect a newly established "father" relationship with respect to Artifact A1. Therefore, such relationship field change has not yet been synchronized to Repository B 7004.

Repository B 7004 stores Artifact B1 7040 and Artifact B2 7050. In particular, Artifacts B1 7040 and B2 7050 have previously been respectively mapped to Artifacts A1 7010 and A2 7020.

Artifact B1 7040 includes an identifier field 7042 (populated with identifier "B1"), an artifact type field 7044 (populated with artifact type "feature"), and a relationship field 7046 that is null. Likewise, Artifact B2 7050 includes an identifier field 7052 (populated with identifier "B2"), an artifact type field 7054 (populated with artifact type "user story"), and a relationship field 7056 that is null, as shown in FIG. 7A.

FIGS. 7A and 7B will now be discussed with reference to method 600 of FIGS. 6A-6C to illustrate one example of an internal-to-internal synchronization.

Referring to FIG. 6A, at 602, the repository synchronizer 126 receives the changed Artifact A2 7020. At 604, the repository synchronizer 126 scans Artifact A2 7020 to identify as unprocessed the relationship field 7026. At 606, the repository synchronizer 126 determines that the unprocessed relationship field 7026 has been found.

At 608, the repository synchronizer 126 determines that an internal-to-internal relationship synchronization is to be performed. For example, at 608 a schema mapping guide associated with Repositories A 7002 and B 7004 can be obtained. The schema mapping guide may indicate that an internal "father" relationship within Repository A 7002 maps to an internal "parent" relationship within Repository B 7004. Therefore, method 600 will proceed to 610.

In some implementations, the schema mapping guide may also provide additional information that maps particular artifact types to other artifact types given the existence of certain relationship. For example, the schema mapping guide may indicate that a "requirement" type artifact within Repository A 7002 that has an existing "father" relationship maps to an "user story" type artifact within Repository B 7004 Thus, the schema mapping guide may provide mappings based on some combination of relationship type and/or artifact type.

At 610, the repository synchronizer 126 resolves the relationship into the identities of the target artifacts. For example, the previous respective mappings between Artifacts A1 7010 and B1 7040 and A2 7020 and B2 7050 may be identified at 610.

At 612, the repository synchronizer 126 determines that neither Artifact B1 7040 nor Artifact B2 7050 are missing, as Artifact B1 7040 and Artifact B2 7050 presently exist within Repository B 7004.

At 618, the repository synchronizer 126 updates the target field to reflect to synchronized relationship. In particular, referring now to FIG. 7B it can be seen that the relationship field 7056 of Artifact B2 has been changed to store data that indicates that the Artifact B1 7040 is the parent of Artifact B2 7050. Thus, the change in the relationship status of Artifact A2 7020 has been synchronized over to Artifact B2 7050, with the corresponding relationship types being directed by the schema mapping guide.

Referring again to FIG. 6A, the relationship field 7026 of Artifact A2 7020 is marked as processed at 620. After 620, method 600 returns to 604.

FIGS. 8A and 8B are block diagrams respectively showing artifacts before and after an internal-to-external synchronization, according to at least one illustrated embodiment. In particular, FIG. 8A shows Repository A 8002 and Repository B 8004 prior to an internal-to-external synchronization while FIG. 8B shows Repository A 8002 and Repository B 8004 after the internal-to-external synchronization.

Referring first to FIG. 8A, Repository A 8002 stores Artifact A1 8010 and Artifact A2 8020.

Artifact A1 8010 includes an identifier field 8012 (populated with identifier "A1"), an artifact type field 8014 (populated with artifact type "requirement"), and a relationship field 8016 that stores data that indicates that Artifact A1 8010 is "tested-by" Artifact A2 8020. Likewise, Artifact A2 8020 includes an identifier field 8022 (populated with identifier "A2"), an artifact type field 8024 (populated with artifact type "test"), and a relationship field 8026 that is null. In some implementations, however, relationship field 8026 indicates that Artifact A2 8020 tests Artifact A1 8010.

The relationship field 8016 of Artifact A 8010 has recently been changed to reflect a newly established "tested-by" relationship with respect to Artifact A2 8020. Therefore, such relationship field change has not yet been synchronized to Repository B 8004.

Repository B 8004 stores Artifact B1 8030. In particular, Artifact B1 8030 has previously been respectively mapped to Artifact A1 8010. Artifact B1 8030 includes an identifier field 8032 (populated with identifier "B1"), an artifact type field 8032 (populated with artifact type "feature"), and a relationship field 8036 that is null.

FIGS. 8A and 8B will now be discussed with reference to method 600 of FIGS. 6A-6C to illustrate one example of an internal-to-external synchronization.

Referring to FIG. 6A, at 602, the repository synchronizer 126 receives the changed Artifact A1 8010. At 604, the repository synchronizer 126 scans Artifact A1 8010 to identify as unprocessed the relationship field 8016. At 606, the repository synchronizer 126 determines that the unprocessed relationship field 8016 has been found.

At 608, the repository synchronizer 126 determines that the synchronization to be performed is not an internal-to-internal synchronization. For example, at 608 a schema mapping guide associated with Repositories A 8002 and B 8004 can be obtained. The schema mapping guide may indicate that an internal "tested-by" relationship within Repository A 8002 does not map to an internal relationship within Repository B 8004. Therefore, method 600 will proceed to 622 of FIG. 6B.

Referring now to FIG. 6B, at 622, the repository synchronizer 126 determines that an internal-to-external relationship synchronization is to be performed. For example, the schema mapping guide associated with Repositories A 8002 and B 8004 may indicate that an internal "tested-by" relationship within Repository A 8002 maps to an external "tested-by" relationship within Repository B 8004. Therefore, method 600 will proceed to 624.

At 624, the repository synchronizer 126 turns the relationship into a resource locator (e.g., a user-selectable URL). The resource locator describes the location of Artifact A2 8020 within Repository A 8002.

At 626, the repository synchronizer 126 queries the Artifact B1 8030 to determine whether a resource locator to Artifact A2 8020 already exists within the data structure of Artifact B1 8030. Because the relationship field 8036 of Artifact B1 8030 is null, no resource locator is found at 626. More precisely, because a "tests" relationship field within Artifact B1 8030 (represented here as relationship field 8036) is null, no existing resource locator to Artifact A2 8020 is found at 626.

At 628, the repository synchronizer 126 merges the resource locator into the relationship field 8036. In particular, as shown in FIG. 8B, the relationship field 8036 now includes data that indicates that the Artifact B1 8030 is "tested-by" Artifact A2 8020 and includes the resource locator. Thus, the change in the relationship status of Artifact A1 8010 has been synchronized over to Artifact B1 8030, with the corresponding relationship types being directed by the schema mapping guide.

The repository synchronizer 126 marks relationship field 8016 of Artifact A1 8010 as processed at 630. After 620, method 600 returns to 604 of FIG. 6A.

FIGS. 9A and 9B are block diagrams respectively showing artifacts before and after an external-to-external synchronization, according to at least one illustrated embodiment. In particular, FIG. 9A shows Repository A 9002, Repository C 9004, and Repository B 9006 prior to an external-to-external synchronization while FIG. 9B shows Repository A 9002, Repository C 9004, and Repository B 9006 after the external-to-external synchronization.

Referring first to FIG. 9A, Repository A 9002 stores Artifact A1 9010. Repository C stores Artifact C1 9020.

Artifact A1 9010 includes an identifier field 9012 (populated with identifier "A1"), an artifact type field 9014 (populated with artifact type "work item"), and a relationship field 9016 that stores data that indicates that Artifact A1 9010 is "tested-by" Artifact C1 9020. In particular, the relationship field 9016 includes a resource locator that provides access to the location of Artifact C1 9020 within Repository C 9004.

Likewise, Artifact C1 9020 includes an identifier field 9022 (populated with identifier "C1"), an artifact type field 9024 (populated with artifact type "test"), and a relationship field 9026 that is null. In some implementations, however, relationship field 9026 indicates that Artifact C1 9020 tests Artifact A1 9010.

The relationship field 9016 of Artifact A 9010 has recently been changed to reflect a newly established "tested-by" relationship with respect to Artifact C1 9020. Therefore, such relationship field change has not yet been synchronized to Repository B 9006.

Repository B 9006 stores Artifact B1 9030. In particular, Artifact B1 9030 has previously been respectively mapped to Artifact A1 9010. Artifact B1 9030 includes an identifier field 9032 (populated with identifier "B1"), an artifact type field 9032 (populated with artifact type "issue"), and a relationship field 9036 that is null.

FIGS. 9A and 9B will now be discussed with reference to method 600 of FIGS. 6A-6C to illustrate one example of an external-to-external synchronization.

Referring to FIG. 6A, at 602, the repository synchronizer 126 receives the changed Artifact A1 9010. At 604, the repository synchronizer 126 scans Artifact A1 9010 to identify as unprocessed the relationship field 9016. At 606, the repository synchronizer 126 determines that the unprocessed relationship field 9016 has been found.

At 608, the repository synchronizer 126 determines that the synchronization to be performed is not an internal-to-internal synchronization. For example, at 608 a schema mapping guide associated with Repositories A 9002 and B 9006 can be obtained. Alternatively, it may be discerned from the external nature of relationship field 9016 itself that the synchronization is not an internal-to-internal synchronization. Therefore, method 600 proceeds to 622 of FIG. 6B.

Referring now to FIG. 6B, at 622, the repository synchronizer 126 determines that an external-to-external relationship synchronization is to be performed. For example, the schema mapping guide associated with Repositories A 9002 and B 9006 may indicate that an external "tested-by" relationship of an artifact of Repository A 9002 maps to an external "tested-by" relationship for an artifact of Repository B 9006. Therefore, method 600 will proceed to 626.

At 626, the repository synchronizer 126 queries the Artifact B1 9030 to determine whether a resource locator to Artifact C1 9020 already exists within the data structure of Artifact B1 9030. Because the relationship field 9036 of Artifact B1 9030 is null, no resource locator is found at 626.

At 629, the repository synchronizer 126 merges the resource locator into the relationship field 9036. In particular, as shown in FIG. 9B, the relationship field 9036 now includes data that indicates that the Artifact B1 9030 is "tested-by" Artifact C1 9020 and includes the resource locator. In some implementations, the resource locator can be copied from the relationship field 9016 of Artifact A1 9010 to the relationship field 9036 of Artifact B1 9030. Thus, the change in the relationship status of Artifact A1 9010 has been synchronized over to Artifact B1 9030, with the corresponding relationship types being directed by the schema mapping guide.

At 630, the repository synchronizer 126 marks the relationship field 9016 of Artifact A1 9010 as processed. After 630, method 600 returns to 604 of FIG. 6A.

The various embodiments described above can be combined to provide further embodiments. The methods or algorithms set out herein may employ additional acts, may omit some acts, and/or may execute acts in a different order than specified.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operation in a repository synchronizer to synchronize artifact relationships across a plurality of repositories, the repositories respectively associated with respective ones of a plurality of software development tools, the repository synchronizer comprising at least one processor and at least one non-transitory processor-readable medium communicatively coupled to the at least one processor and which stores at least one of processor-executable instructions or data, the method comprising:

for a first source artifact in a first repository associated with a first development tool, the first source artifact which is logically associated by a defined first relationship of a first relationship type with a second source artifact;

identifying, autonomously by the repository synchronizer, a first target artifact in a second repository that corresponds to the first source artifact, the second repository associated with a second development tool, the second development tool different from the first development tool;

determining, autonomously by the repository synchronizer, a defined second relationship type for a second relationship between the first target artifact in the second repository that corresponds to the first source artifact in the first repository and a second target artifact that corresponds to the second source artifact based at least in part on a schema mapping guide that provides a relationship mapping from the first relationship type in the first repository to the defined second relationship type in the second repository, the determined defined second relationship type from a second set of defined relationship types for the second repository which is different from a first set of defined relationship types for the first repository; and causing, autonomously by the repository synchronizer, the second relationship between the first target artifact and the second target artifact to match the determined defined second relationship type.

2. The method of claim 1 wherein determining the defined second relationship type based at least in part on a schema mapping guide that provides a relationship mapping from the first relationship type in the first repository to the defined second relationship type in the second repository comprises determining the defined second relationship type based at least in part on the schema mapping guide that provides a user-defined relationship mapping from the first relationship type in the first repository to the defined second relationship type in the second repository.

3. The method of claim 1 wherein causing the second relationship between the first target artifact and the second target artifact to match the determined defined second relationship type comprises establishing the second relationship of the determined defined second relationship type between the first target artifact and the second target artifact.

4. The method of claim 1 wherein causing the second relationship between the first target artifact and the second target artifact to match the determined defined second relationship type comprises changing the second relationship between the first target artifact and the second target artifact to the determined defined second relationship type from a third relationship type.

5. The method of claim 1 wherein causing the second relationship between the first target artifact and the second target artifact to match the determined defined second relationship type comprises determining that the second relationship exists between the first target artifact and the second target artifact as the determined defined second relationship type and leaving the second relationship between the first target artifact and the second target artifact as the determined defined second relationship type.

6. The method of claim 1, further comprising, prior to identifying the first target artifact in the second repository that corresponds to the first source artifact:

receiving an indication of an alteration of one or more data fields associated with the first source artifact; and scanning the data fields of the first source artifact to identify as unprocessed the defined first relationship.

7. The method of claim 1 wherein identifying the first target artifact in the second repository that corresponds to the first source artifact comprises identifying, periodically and not responsive to human prompting, the first target artifact in the second repository that corresponds to the first source artifact, determining the defined second relationship type for the second relationship comprises determining, periodically and not responsive to human prompting, the defined second relationship type for the second relationship, and causing the second relationship between the first target artifact and the second target artifact to match the determined defined second relationship type comprises causing, periodically and not responsive to human prompting, the second relationship between the first target artifact and the second target artifact to match the determined defined second relationship type.

8. The method of claim 1 wherein each of the first source artifact, the second source artifact, the first target artifact, and the second target artifact comprise one of a task, a goal, a user story, an epic, a defect, a requirement, an issue, a folder, a changeset, or a test.

9. The method of claim 1 wherein determining a defined second relationship type for a second relationship between the first target artifact in the second repository that corresponds to the first source artifact in the first repository and a second target artifact that corresponds to the second source artifact comprises:

determining whether the first relationship between the first source artifact and the second source artifact is an internal relationship within the first repository;

responsive to determining that the first relationship is an internal relationship within the first repository, determining whether the second relationship between the first target artifact and the second target artifact is to be an internal relationship within the second repository; and responsive to determining that the second relationship is to be an internal relationship within the second repository, determining whether the second target artifact exists within the second repository.

10. The method of claim 9 wherein determining a defined second relationship type for a second relationship between the first target artifact in the second repository that corresponds to the first source artifact in the first repository and a second target artifact that corresponds to the second source artifact further comprises marking one or more of the first source artifact, the defined first relationship, and the second target artifact as pending in response to determining that the second target artifact does not exist within the second repository.

11. The method of claim 1 wherein determining a defined second relationship type for a second relationship between the first target artifact in the second repository that corresponds to the first source artifact in the first repository and a second target artifact that corresponds to the second source artifact comprises:
   determining whether the first relationship between the first source artifact and the second source artifact is an internal relationship within the first repository;
   responsive to determining that the first relationship is an internal relationship within the first repository, determining whether the second relationship between the first target artifact and the second target artifact is to be an internal relationship within the second repository; and
   responsive to determining that the second relationship is not to be an internal relationship within the second repository, generating a resource locator that describes a location of the second target artifact within the first repository or a third repository.

12. The method of claim 11 wherein generating a resource locator that describes a location of the second source artifact within the first repository or a third repository comprises generating a user-selectable uniform resource locator (URL) providing access to the location of the second target artifact within the first repository or the third repository.

13. The method of claim 11 wherein causing the second relationship between the first target artifact and the second target artifact to match the determined defined second relationship type comprises associating the resource locator that describes the location of the second target artifact with the first target artifact as the second relationship.

14. The method of claim 1 wherein determining a defined second relationship type for a second relationship comprises determining whether the first relationship between the first source artifact and the second source artifact is an internal relationship within the first repository and causing the second relationship between the first target artifact and the second target artifact to match the determined defined second relationship type comprises, responsive to determining that the first relationship is not an internal relationship within the first repository, merging a resource locator that describes a location of the second source artifact within the first repository or a third repository with any existing resource locators associated with existing relationships of the first target artifact.

15. A system to enable collaborative development of software products across a plurality of software development tools, comprising:
   at least a first repository that stores a first plurality of artifacts associated with a first software development tool and a second repository that stores a second plurality of artifacts associated with a second software development tool that is different from the first software development tool; and
   a repository synchronizer to synchronize artifact relationships across at least the first and second repositories, the repository synchronizer comprising at least one processor and at least one non-transitory processor-readable medium communicatively coupled to at least one processor and which stores processor-executable instructions, execution of which causes, for at least a first source artifact of the first repository that is logically associated by a defined first relationship of a first relationship type with a second source artifact, the repository synchronizer to:
      identify a first target artifact in the second repository that corresponds to the first source artifact;
      determine a defined second relationship type for a second relationship between the first target artifact in the second repository that corresponds to the first source artifact in the first repository and a second target artifact that corresponds to the second source artifact based at least in part on a schema mapping guide that provides a relationship mapping between the first relationship type in the first repository and the defined second relationship type in the second repository, the determined defined second relationship type from a second set of defined relationship types for the second repository which is different from a first set of defined relationship types for the first repository; and
      cause the second relationship between the first target artifact and the second target artifact to match the determined defined second relationship type.

16. The system of claim 15 wherein the relationship mapping provided by the schema mapping guide is user-defined.

17. The system of claim 15 wherein the instructions that cause the repository synchronizer to cause the second relationship between the first target artifact and the second target artifact to match the determined defined second relationship type cause the repository synchronizer to establish the second relationship of the determined defined second relationship type between the first target artifact and the second target artifact.

18. The system of claim 15 wherein the instructions that cause the repository synchronizer to cause the second relationship between the first target artifact and the second target artifact to match the determined defined second relationship type cause the repository synchronizer to change the second relationship between the first target artifact and the second target artifact to the determined defined second relationship type from a third relationship type.

19. The system of claim 15 wherein the instructions that cause the repository synchronizer to cause the second relationship between the first target artifact and the second target artifact to match the determined defined second relationship type cause the repository synchronizer to determine that the second relationship exists between the first target artifact and the second target artifact as the determined defined second relationship type and leave the second relationship between the first target artifact and the second target artifact as the determined defined second relationship type.

20. The system of claim 15 wherein the instructions cause the repository synchronizer to autonomously identify the first target artifact in the second repository, autonomously determine the defined second relationship type for the second relationship, and autonomously cause the second relationship between the first target artifact and the second target artifact to match the determined defined second relationship type.

21. The system of claim 15 wherein the instructions cause the repository synchronizer to periodically and not responsive to human prompting identify the first target artifact in the second repository, periodically and not responsive to human prompting determine the defined second relationship type for the second relationship, and periodically and not responsive to human prompting cause the second relationship between the first target artifact and the second target artifact to match the determined defined second relationship type.

22. A method to synchronize artifact relationships across a plurality of repositories respectively associated with a plurality of software development tools, the method comprising:

receiving, by one or more computing devices, data that describes a first attribute field associated with a first source artifact contained in a source repository associated with a first software development tool of the plurality of software development tools, the first attribute field that describes a first relationship of a first relationship type between the first source artifact and at least a second source artifact;

obtaining, by the one or more computing devices, a schema mapping guide that describes at least one relationship mapping between the first relationship type in the source repository and a second relationship type in a target repository associated with a second software development tool of the plurality of software development tools, the second software development tool different than the first software development tool; and updating, by the one or more computing devices based at least in part on the first attribute field and the schema mapping guide, a second attribute field associated with a first target artifact contained in the target repository to describe a second relationship of the second relationship type between the first target artifact and at least a second target artifact.

23. The method of claim 22 wherein obtaining, by the one or more computing devices, the schema mapping guide comprises obtaining, by the one or more computing devices, the schema mapping guide that describes at least one user-defined relationship mapping between the first relationship type in the source repository and the second relationship type in the target repository.

24. The method of claim 22 wherein receiving, by the one or more computing devices, data that describes a first attribute field associated with a first source artifact comprises receiving, by the one or more computing devices, an indication that a change has occurred in one or more attribute fields associated with the first source artifact and scanning, by the one or more computing devices, the one or more attribute fields to identify as unprocessed a change in the first attribute field.

25. The method of claim 22, further comprising:

determining, by the one or more computing devices, whether the second target artifact is included in the target repository with the first target artifact, wherein when it is determined that the second target artifact is not included in the target repository with the first target artifact, updating, by the one or more computing devices based at least in part on the first attribute field and the schema mapping guide, a second attribute field associated with a first target artifact comprises generating, by the one or more computing devices, a resource locator that describes a location of the second target artifact within the source repository or a third repository and associating, by the one or more computing devices, the resource locator with the first target artifact.

26. The method of claim 22, further comprising:

determining, by the one or more computing devices, whether the second source artifact is included in the source repository with the first source artifact, wherein when it is determined that the second source artifact is not included in the source repository with the first source artifact, updating, by the one or more computing devices based at least in part on the first attribute field and the schema mapping guide, a second attribute field associated with a first target artifact comprises associating, by the one or more computing devices, a resource locator that describes a location of the second source artifact with the first target artifact.

\* \* \* \* \*